United States Patent
Yamamoto et al.

(10) Patent No.: US 12,153,204 B2
(45) Date of Patent: Nov. 26, 2024

(54) OBJECTIVE LENS FOR ENDOSCOPE AND ENDOSCOPE

(71) Applicant: FUJIFILM Corporation, Tokyo (JP)

(72) Inventors: Chikara Yamamoto, Saitama (JP); Masato Kondo, Saitama (JP)

(73) Assignee: FUJIFILM Corporation, Tokyo (JP)

(*) Notice: Subject to any disclaimer, the term of this patent is extended or adjusted under 35 U.S.C. 154(b) by 675 days.

(21) Appl. No.: 17/399,458

(22) Filed: Aug. 11, 2021

(65) Prior Publication Data
US 2022/0050284 A1 Feb. 17, 2022

(30) Foreign Application Priority Data
Aug. 17, 2020 (JP) ................ 2020-137467

(51) Int. Cl.
*G02B 23/24* (2006.01)
*G02B 9/60* (2006.01)
*G02B 9/62* (2006.01)
*G02B 9/64* (2006.01)
*G02B 13/18* (2006.01)

(52) U.S. Cl.
CPC ............ *G02B 23/243* (2013.01); *G02B 9/60* (2013.01); *G02B 9/62* (2013.01); *G02B 9/64* (2013.01); *G02B 13/18* (2013.01)

(58) Field of Classification Search
CPC ......... G02B 23/243; G02B 9/60; G02B 9/62; G02B 9/64; G02B 13/18
USPC .......................................... 359/770
See application file for complete search history.

(56) References Cited

U.S. PATENT DOCUMENTS

| | | | |
|---|---|---|---|
| 2010/0265355 A1* | 10/2010 | Sato | G02B 27/0025 348/222.1 |
| 2016/0178885 A1* | 6/2016 | Harada | G02B 23/243 359/753 |

FOREIGN PATENT DOCUMENTS

| | | | |
|---|---|---|---|
| JP | 2004-240464 A | | 8/2004 |
| JP | 2008-276260 A | | 11/2008 |
| JP | 2010-271689 A | | 12/2010 |
| JP | 2011048086 A | * | 3/2011 |
| JP | 2014-206744 A | | 10/2014 |
| JP | 2016-114870 A | | 6/2016 |
| JP | 2019032407 A | * | 2/2019 |

(Continued)

OTHER PUBLICATIONS

JP-2019179155-A—Oct. 2019—Sugiyama T—English translation.*

(Continued)

*Primary Examiner* — Sharrief I Broome
(74) *Attorney, Agent, or Firm* — Studebaker & Brackett PC

(57) ABSTRACT

The objective lens for an endoscope includes a stop, at least one lens which is disposed closer to an object side than the stop and of which an image-side lens surface is a concave surface, and at least one set of cemented lenses that is disposed closer to an image side than the stop; focusing on an object positioned at a nearest point from an object positioned at a farthest point is performed by movement of some lenses of an entire system along an optical axis; the objective lens for an endoscope has a total angle of view of 120° or more in a state where focusing on the object positioned at the farthest point is performed and in a state where focusing on the object positioned at the nearest point is performed; and the objective lens for an endoscope satisfies predetermined conditional expressions.

16 Claims, 15 Drawing Sheets

EXAMPLE 1

(56) References Cited

FOREIGN PATENT DOCUMENTS

JP          2019179155 A  * 10/2019
WO          2020/174561 A1    9/2020

OTHER PUBLICATIONS

JP-2019032407-A—2-019—Tsuji Y—English translation.*
JP-2011048086-A—Mar. 2011—Mizusawa M—English translation.*
An Office Action; "Notice of Reasons for Refusal," mailed by the Japanese Patent Office on May 9, 2023, which corresponds to Japanese Patent Application No. 2020-137467 and is related to U.S. Appl. No. 17/399,458; with English language translation.
An Office Action; "Notice of Reasons for Refusal," mailed by the Japanese Patent Office on Aug. 1, 2023, which corresponds to Japanese Patent Application No. 2020-137467 and is related to U.S. Appl. No. 17/399,458; with English language translation.

* cited by examiner

FIG. 1
EXAMPLE 1
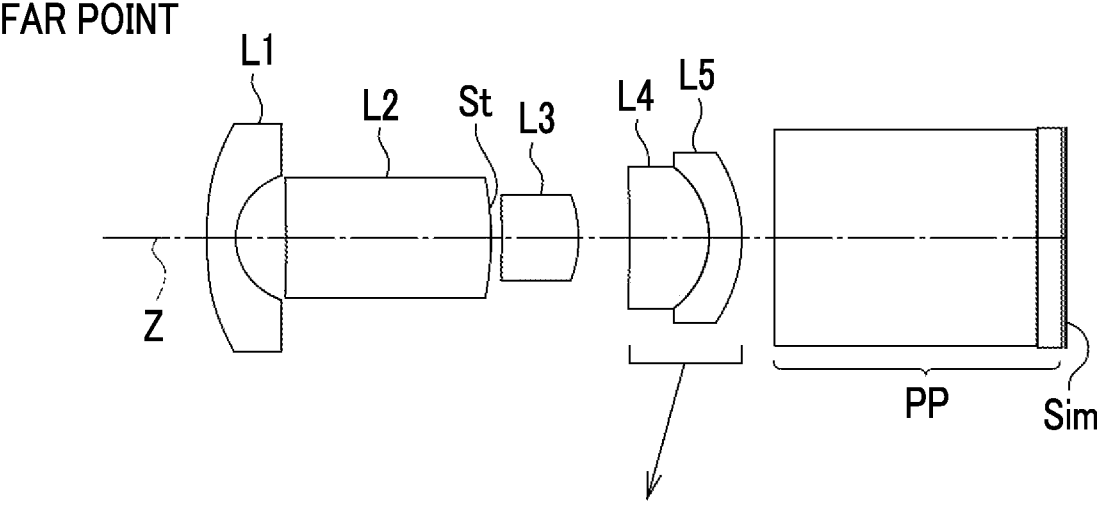
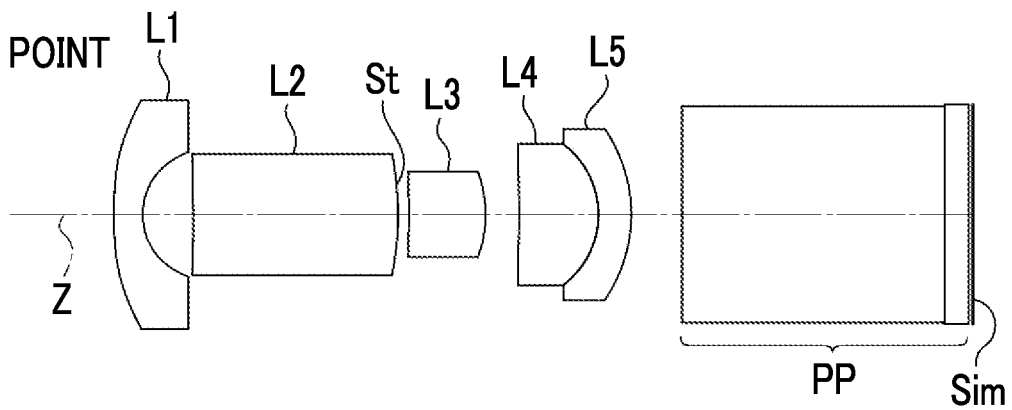

FIG. 2
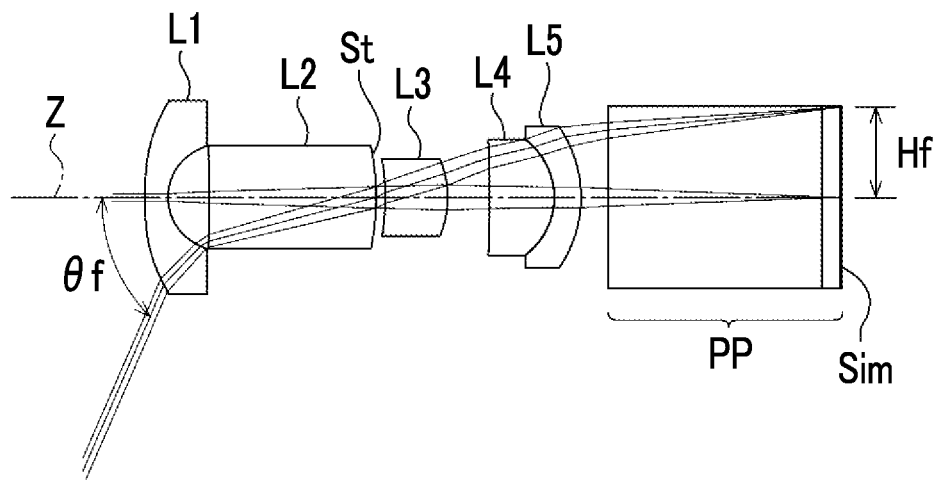
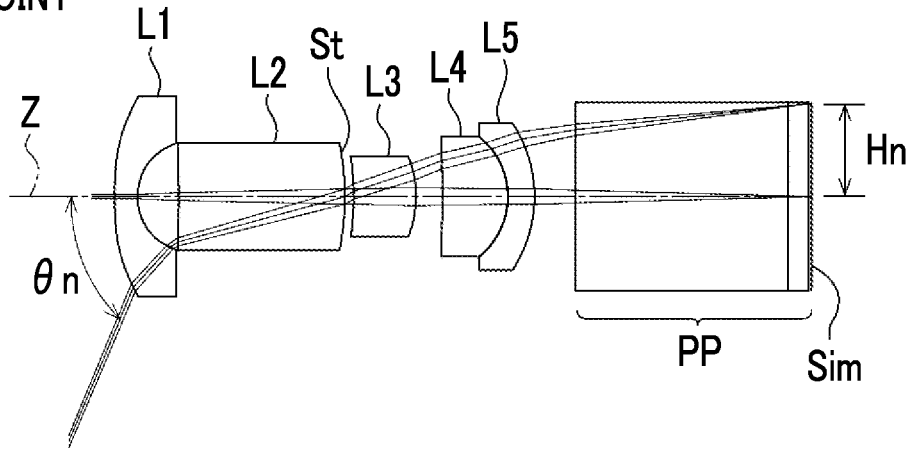

FIG. 4
EXAMPLE 2
FAR POINT
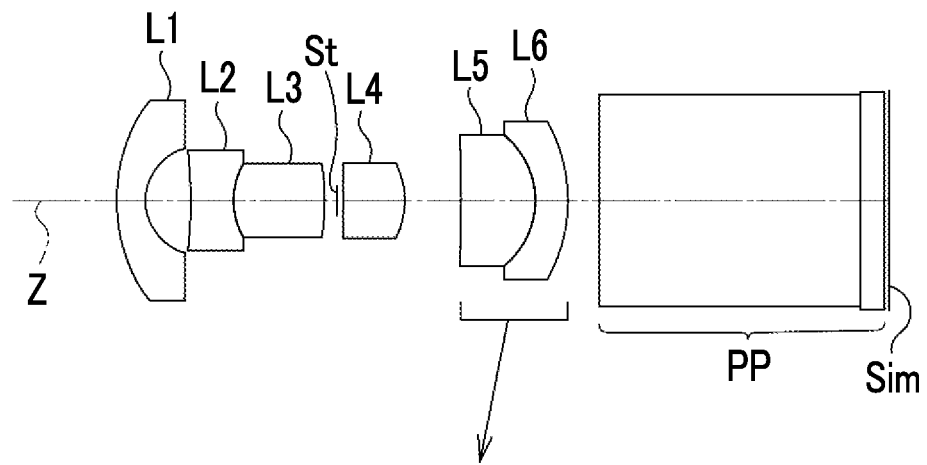
NEAR POINT
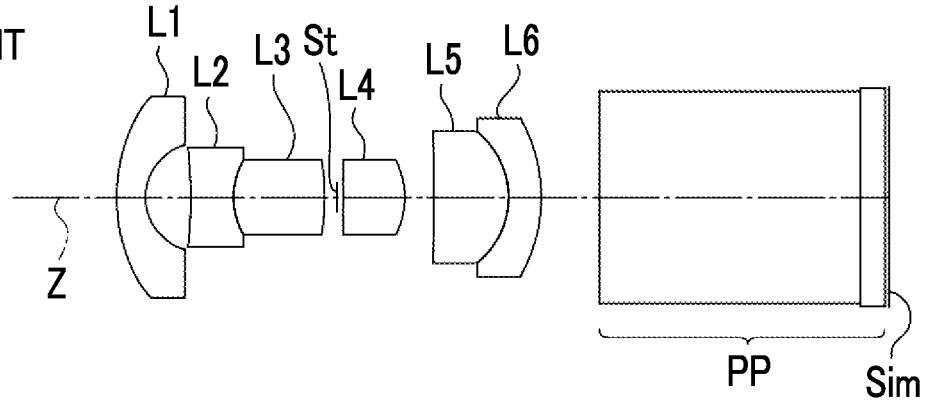

FIG. 10
EXAMPLE 5
FAR POINT
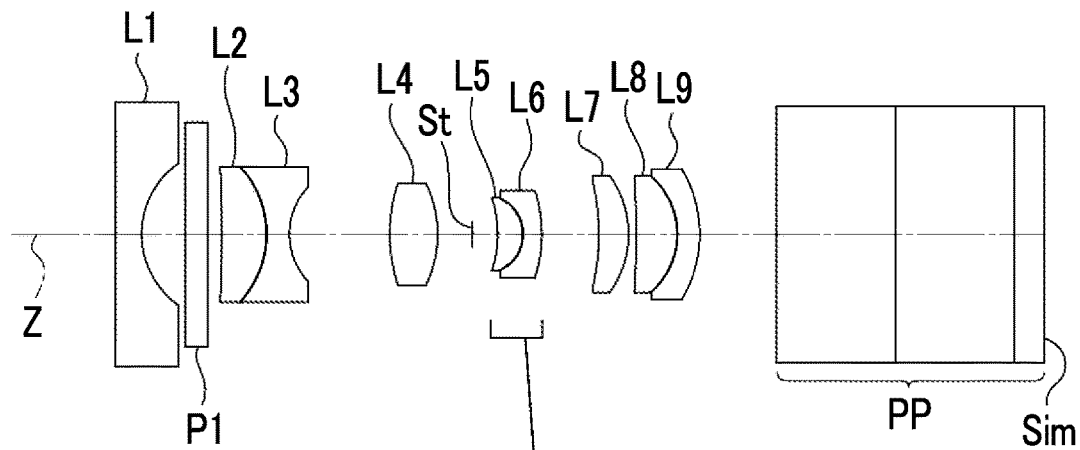
NEAR POINT
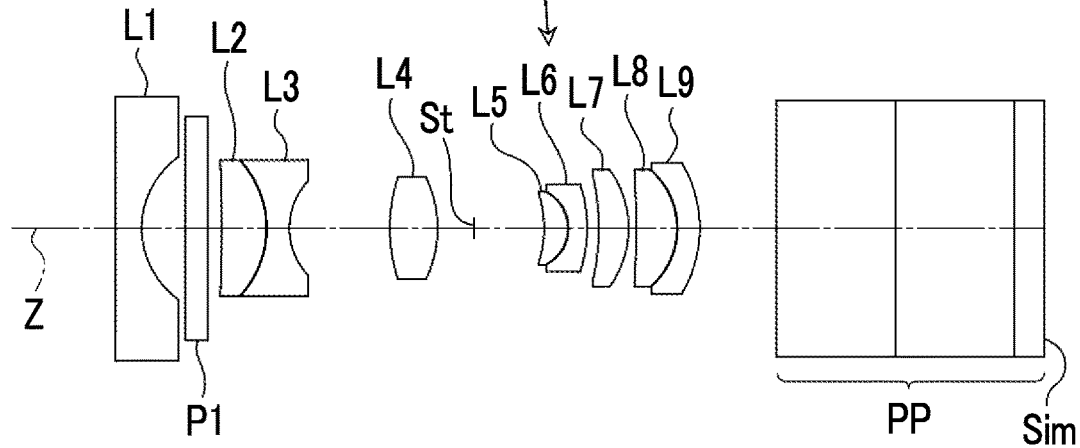

FIG. 12
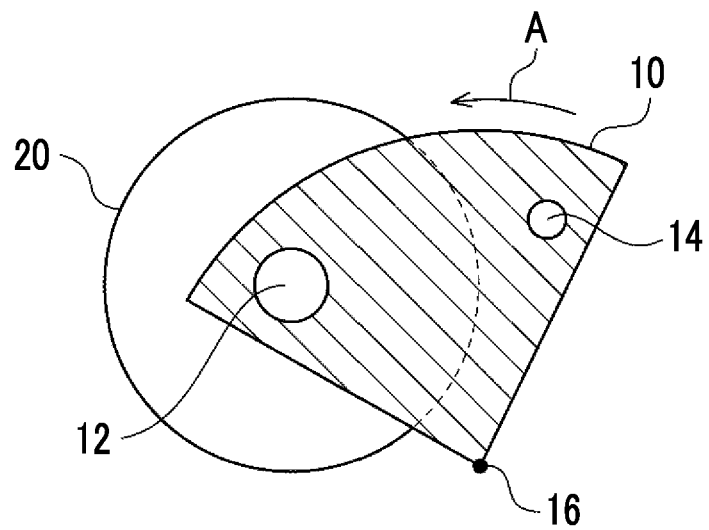
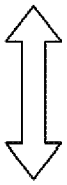
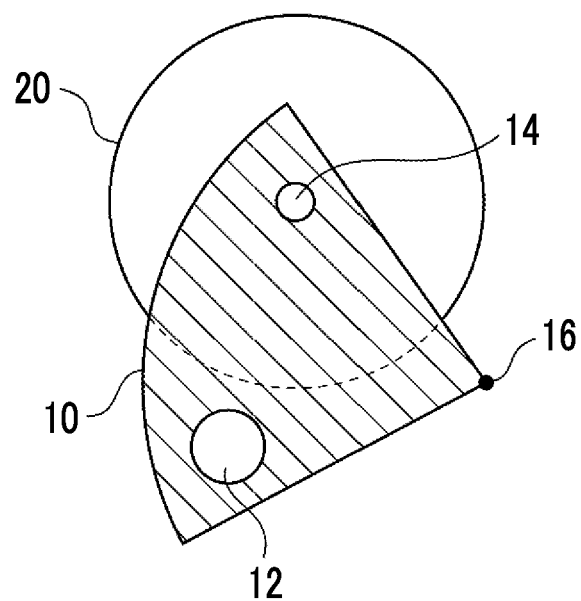

OBJECTIVE LENS FOR ENDOSCOPE AND ENDOSCOPE

CROSS-REFERENCE TO RELATED APPLICATION

The present application claims priority under 35 U.S.C. § 119 to Japanese Patent Application No. 2020-137467, filed on Aug. 17, 2020. The above application is hereby expressly incorporated by reference, in its entirety, into the present application.

BACKGROUND

Technical Field

The present disclosure relates to an objective lens for an endoscope and an endoscope.

Related Art

In the related art, an objective lens disclosed in JP2016-114870A is known as an objective lens for an endoscope that focuses on an object positioned at the nearest point from an object positioned at the farthest point.

In recent years, an objective lens for an endoscope that can switch between focusing on an object positioned at a far point and focusing on an object positioned at a near point and has a large depth of field in a near point-object-observation state has been required.

SUMMARY

The disclosure has been made in consideration of the above-mentioned circumstances, and an object of the disclosure is to provide an objective lens for an endoscope that can switch between focusing on an object positioned at a far point and focusing on an object positioned at a near point and has a large depth of field in a near point-object-observation state and good optical performance, and an endoscope including this objective lens for an endoscope.

An objective lens for an endoscope according to a first aspect of the disclosure comprises a stop, at least one lens which is disposed closer to an object side than the stop and of which an image-side lens surface is a concave surface, and at least one set of cemented lenses that is disposed closer to an image side than the stop. Focusing on an object positioned at a nearest point from an object positioned at a farthest point is performed by movement of some lenses of an entire system along an optical axis. The objective lens for an endoscope has a total angle of view of 120° or more in a state where focusing on the object positioned at the farthest point is performed and in a state where focusing on the object positioned at the nearest point is performed. In a case where a focal length of the entire system in a state where focusing on the object positioned at the nearest point is performed is denoted by fn, a half angle of view in a state where focusing on the object positioned at the nearest point is performed is denoted by $\theta n$, and a maximum image height in a state where focusing on the object positioned at the nearest point is performed is denoted by Hn, Conditional expression (1) is satisfied.

$$1.4 < fn \times (\tan \theta n)/Hn < 2 \tag{1}$$

An objective lens for an endoscope according to a second aspect of the disclosure a stop, at least one lens which is disposed closer to an object side than the stop and of which an image-side lens surface is a concave surface, and at least one set of cemented lenses that is disposed closer to an image side than the stop. Focusing on an object positioned at a nearest point from an object positioned at a farthest point is performed by movement of some lenses of an entire system along an optical axis. The objective lens for an endoscope has a total angle of view of 120° or more in a state where focusing on the object positioned at the farthest point is performed and in a state where focusing on the object positioned at the nearest point is performed. In a case where an F number in a state where focusing on the object positioned at the nearest point is performed is denoted by Fn and an F number in a state where focusing on the object positioned at the farthest point is performed is denoted by Ff, Conditional expression (2) is satisfied.

$$1.1 < Fn/Ff < 3 \tag{2}$$

Hereinafter, in this section, the objective lens for an endoscope according to the first aspect of the disclosure and the objective lens for an endoscope according to the second aspect of the disclosure will be collectively referred to as the objective lens for an endoscope according to the aspect of the disclosure.

In a case where a focal length of the entire system in a state where focusing on the object positioned at the nearest point is performed is denoted by fn, a half angle of view in a state where focusing on the object positioned at the nearest point is performed is denoted by $\theta n$, and a maximum image height in a state where focusing on the object positioned at the nearest point is performed is denoted by Hn, it is preferable that the objective lens for an endoscope according to the aspect of the disclosure satisfies Conditional expression (1-1) and it is more preferable that the objective lens for an endoscope according to the aspect of the disclosure satisfies Conditional expression (1-2).

$$1.5 < fn \times (\tan \theta n)/Hn < 1.9 \tag{1-1}$$

$$1.6 < fn \times (\tan \theta n)/Hn < 1.9 \tag{1-2}$$

In a case where an F number in a state where focusing on the object positioned at the nearest point is performed is denoted by Fn and an F number in a state where focusing on the object positioned at the farthest point is performed is denoted by Ff, it is preferable that the objective lens for an endoscope according to the aspect of the disclosure satisfies Conditional expression (2-1) and it is more preferable that the objective lens for an endoscope according to the aspect of the disclosure satisfies Conditional expression (2-2).

$$1.2 < Fn/Ff < 2.5 \tag{2-1}$$

$$1.2 < Fn/Ff < 2 \tag{2-2}$$

In a case where a focal length of the entire system in a state where focusing on the object positioned at the nearest point is performed is denoted by fn and a focal length of the entire system in a state where focusing on the object positioned at the farthest point is performed is denoted by ff, it is preferable that the objective lens for an endoscope according to the aspect of the disclosure satisfies Conditional expression (3) and it is more preferable that the objective lens for an endoscope according to the aspect of the disclosure satisfies Conditional expression (3-1).

$$0.7 < fn/ff < 1.2 \tag{3}$$

$$0.8 < fn/ff < 1.1 \tag{3-1}$$

The objective lens for an endoscope according to the aspect of the disclosure may further include a stop member that includes an aperture portion, and may be adapted so that an F number is changed by movement of the stop member during the focusing. In this configuration, in a case where an interval on the optical axis between a lens disposed on an object side of the stop in succession to the stop and a lens disposed on an image side of the stop in succession to the stop in a state where focusing on the object positioned at the farthest point is performed is denoted by Df and a focal length of the entire system in a state where focusing on the object positioned at the farthest point is performed is denoted by ff, it is preferable that the objective lens for an endoscope according to the aspect of the disclosure satisfies Conditional expression (4) and it is more preferable that the objective lens for an endoscope according to the aspect of the disclosure satisfies Conditional expression (4-1).

$$0.3<f\!f\!/Df<15 \qquad (4)$$

$$0.5<f\!f\!/Df<12 \qquad (4\text{-}1)$$

The objective lens for an endoscope according to the aspect of the disclosure may further comprise an aspherical lens which is disposed closer to the object side than the stop and of which an object-side lens surface has a shape of a convex surface near the optical axis and has positive refractive power increasing toward a periphery.

In a case where a focal length of the entire system in a state where focusing on the object positioned at the nearest point is performed is denoted by fn and an interval on the optical axis between a lens, which is disposed on an object side of the stop in succession to the stop, and the stop in a state where focusing on the object positioned at the nearest point is performed is denoted by Dsn, it is preferable that the objective lens for an endoscope according to the aspect of the disclosure satisfies Conditional expression (5) and it is more preferable that the objective lens for an endoscope according to the aspect of the disclosure satisfies Conditional expression (5-1).

$$0.3<f\!n/Dsn<2.5 \qquad (5)$$

$$0.5<f\!n/Dsn<2 \qquad (5\text{-}1)$$

It is preferable that an object-side lens surface of a lens, which is disposed on an object side of the stop in succession to the stop, is a convex surface.

The objective lens for an endoscope according to the aspect of the disclosure may be adapted so that focusing on the object positioned at the nearest point from the object positioned at the farthest point is performed by integral movement of a lens group, which includes a lens of the entire system closest to the image side, along the optical axis.

The objective lens for an endoscope according to the aspect of the disclosure may be adapted so that focusing on the object positioned at the nearest point from the object positioned at the farthest point is performed by integral movement of a lens group, which includes at least one lens disposed in succession to the stop, along the optical axis.

An endoscope according to another aspect of the disclosure comprises the objective lens for an endoscope according to the aspect of the disclosure.

"Consisting of" and "consist of" in this specification may intend to include: a lens substantially not having refractive power; optical elements other than the lens, such as a stop, a filter, and a cover glass; a lens flange; a lens barrel; an image pickup element; and the like other than described components.

In this specification, "lens having positive refractive power" and "positive lens" are synonymous with each other. "Lens having negative refractive power" and "negative lens" are synonymous with each other. "Single lens" means one lens that is not cemented. However, a compound aspherical lens (a lens of which a spherical lens and an aspherical film formed on the spherical lens are integrated and which functions as one aspherical lens as a whole) is treated as one lens without being regarded as a cemented lens. The sign of refractive power and the shape of the surface of a lens including an aspheric surface are considered in a paraxial region unless otherwise specified.

In this specification, "the entire system" means the objective lens for an endoscope. "Focal length" used in Conditional expressions is a paraxial focal length. Values in Conditional expressions are values that are obtained in a case where the d line is used as a reference. "d line", "C line", "F line", and "e line" described in this specification are emission lines, and the wavelength of the d line is 587.56 nm (nanometer), the wavelength of the C line is 656.27 nm (nanometer), the wavelength of the F line is 486.13 nm (nanometer), and the wavelength of the e line is 546.07 nm (nanometer).

According to the disclosure, it is possible to provide an objective lens for an endoscope that can switch between focusing on an object positioned at a far point and focusing on an object positioned at a near point and has a large depth of field in a near point-object-observation state and good optical performance, and an endoscope including this objective lens for an endoscope.

BRIEF DESCRIPTION OF THE DRAWINGS

FIG. 1 is a cross-sectional view showing the configuration of an objective lens for an endoscope according to an embodiment corresponding to an objective lens for an endoscope of Example 1.

FIG. 2 is a cross-sectional view showing the configuration of the objective lens for an endoscope shown in FIG. 1 and luminous flux.

FIG. 4 is a cross-sectional view showing the configuration of an objective lens for an endoscope of Example 2.

FIG. 10 is a cross-sectional view showing the configuration of an objective lens for an endoscope of Example 5.

FIG. 12 is a diagram showing a first configuration example of a stop member.

DESCRIPTION OF EMBODIMENTS

Figure 3:
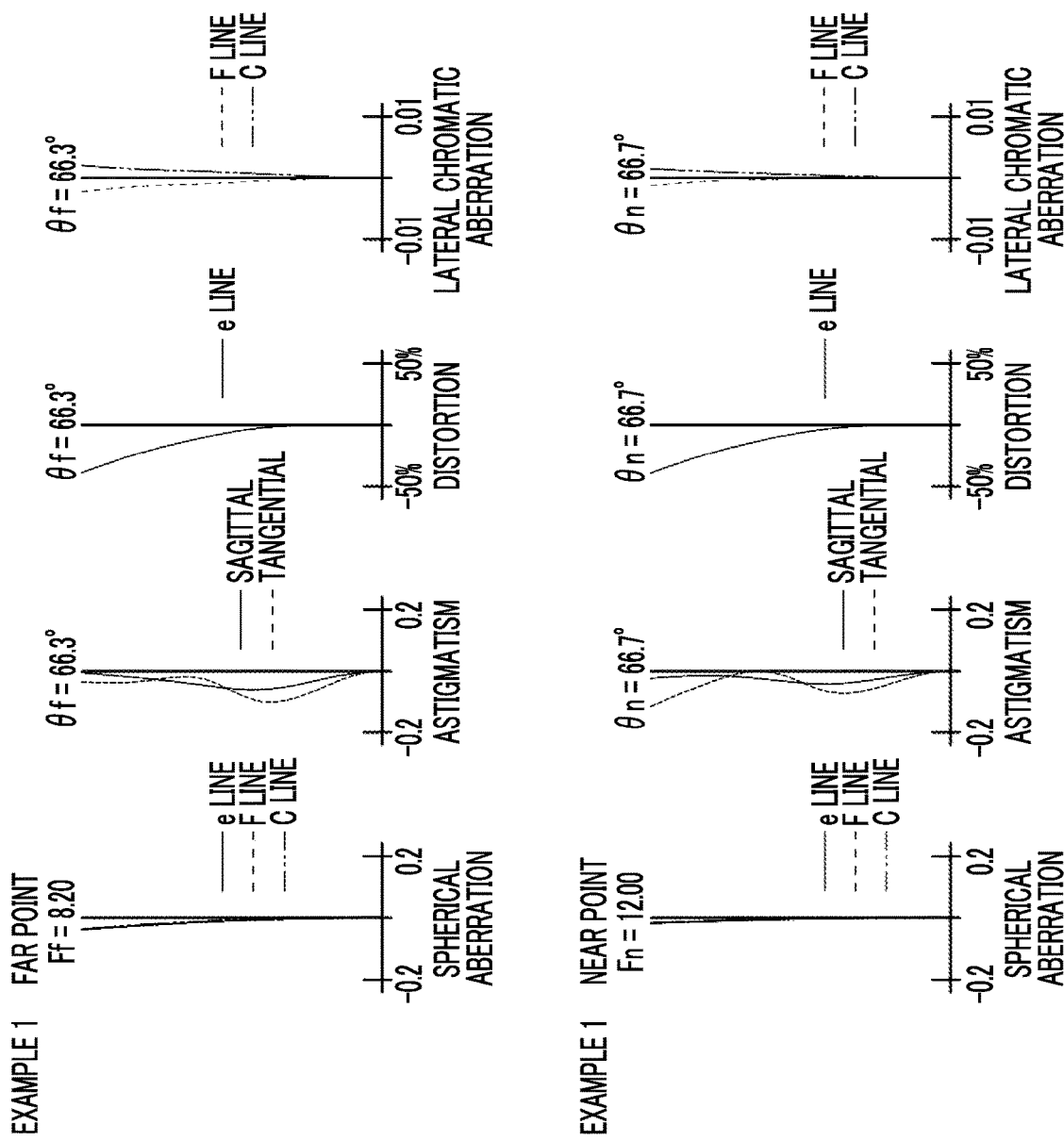
FIG. 3 is a diagram showing the respective aberrations of the objective lens for an endoscope of Example 1.

An embodiment of the disclosure will be described in detail below with reference to the drawings.

With an endoscope, there are a desire to observe a wide range as a whole and a desire to partially observe an affected area or the like found in the overall observation in detail. In order to meet the desires, an objective lens for an endoscope according to the embodiment of the disclosure is adapted to be capable of focusing on an object positioned at a far point and an object positioned at a near point. Accordingly, a far point-side observation state suitable for overall observation and a near point-side observation state suitable for partial observation can be used while being switched. In the following description, a state where the objective lens for an endoscope focuses on an object positioned at the farthest point will be referred to as a farthest point-focusing state and a state where the objective lens for an endoscope focuses on an object positioned at the nearest point will be referred to as a nearest point-focusing state. The farthest point-focusing state corresponds to a farthest point-object-observation state, and the nearest point-focusing state corresponds to a nearest point-object-observation state.

FIG. 1 shows the configuration of the objective lens for an endoscope according to the embodiment of the disclosure in a cross section including an optical axis Z. FIG. 2 shows the configuration of the objective lens for an endoscope shown in FIG. 1 in a cross section, which includes the optical axis Z, and luminous flux. Luminous flux passing through the axis and luminous flux passing at the maximum image height are shown in FIG. 2 as the luminous flux. An example shown in FIGS. 1 and 2 corresponds to Example 1 to be described later. In FIGS. 1 and 2, a left side is an object side, a right side is an image side, the farthest point-focusing state is shown in an upper row with "far point", and the nearest point-focusing state is shown in a lower row with "near point". A description will be made below mainly with reference to FIG. 1.

For example, the objective lens for an endoscope shown in FIG. 1 consists of a lens L1, a lens L2, an aperture stop St, a lens L3, a lens L4, and a lens L5 that are arranged in this order from the object side toward the image side along the optical axis Z. The lenses L4 and L5 are cemented to each other.

An example in which an optical member PP of which the incident surface and the emission surface are parallel to each other is disposed between the lens L5 and an image plane Sim is shown in FIG. 1. The optical member PP is a member assuming a prism, a filter, a cover glass, and the like. The optical member PP is a member not having refractive power, and can also be omitted.

This objective lens for an endoscope is adapted to have a total angle of view of 120° or more in both the farthest point-focusing state and the nearest point-focusing state. According to this configuration, a wide field of view can be ensured. FIG. 2 shows a half angle θf of view in the farthest point-focusing state and a half angle θn of view in the nearest point-focusing state. The total angle of view is double the half angle of view.

This objective lens for an endoscope comprises an aperture stop St, at least one lens which is disposed closer to the object side than the aperture stop St and of which an image-side lens surface is a concave surface, and at least one set of cemented lenses that is disposed closer to the image side than the aperture stop St. In a case where this configuration is employed, it is advantageous in widening the angle of view of the optical system while suppressing astigmatism. In the example shown in FIG. 1, the image-side lens surface of the lens L1 disposed closer to the object side than the aperture stop St is a concave surface and the lenses L4 and L5 disposed closer to the image side than the aperture stop St form a cemented lens.

In this objective lens for an endoscope, focusing on the object positioned at the nearest point from the object positioned at the farthest point is performed by the movement of some lenses of the entire system along the optical axis Z. That is, only some lenses of the objective lens for an endoscope are moved along the optical axis Z during focusing on the object positioned at the nearest point from the object positioned at the farthest point. In the following description, a lens group that moves during focusing will be referred to as a focus lens group. A lens moving mechanism in configuration where only some lenses of the objective lens for an endoscope are moved during focusing can be made smaller than that in configuration where the entire lens system is moved during focusing.

The focus lens group may be a lens group that includes a lens of the entire system closest to the image side, and may be adapted so that focusing on the object positioned at the nearest point from the object positioned at the farthest point is performed by the integral movement of this focus lens group along the optical axis Z. In this case, it is advantageous in keeping a change in the focal length of the entire system during focusing small.

In the example shown in FIG. 1, the focus lens group consists of a cemented lens that is composed of the lenses L4 and L5, and is moved to the object side during focusing on the object positioned at the nearest point from the object positioned at the farthest point. A parenthesis and an arrow inclined downward to the left, which are shown between the upper and lower rows of FIG. 1 and correspond to the lenses L4 and L5, mean that the focus lens group consists of the lenses L4 and L5 and is moved to the object side during focusing on the object positioned at the nearest point from the object positioned at the farthest point.

Alternatively, the focus lens group may be a lens group that includes at least one lens disposed in succession to the aperture stop St and may be adapted so that focusing on the object positioned at the nearest point from the object positioned at the farthest point is performed by the integral movement of this focus lens group along the optical axis Z. Since the focus lens group can be reduced in size in this case, it is advantageous in reducing the diameter of the entire lens system.

In this specification, "integral movement" means that members are simultaneously moved in the same direction by the same distance. Further, in this specification, "~ lens group" is not limited to configuration where ~ lens group consists of a plurality of lenses and may have configuration where ~ lens group consists of only one lens.

In a case where the focal length of the entire system in the nearest point-focusing state is denoted by fn, a half angle of view in the nearest point-focusing state is denoted by θn, and the maximum image height in the nearest point-focusing state is denoted by Hn, it is preferable that this objective lens for an endoscope satisfies Conditional expression (1). tan of Conditional expression (1) is tangent. Since fn×(tan θn)/Hn is made to be larger than the lower limit of Conditional expression (1), it is advantageous in keeping a magnification ratio near the center of an image formation region at a significant magnitude. Accordingly, it is easier to make an observation and a diagnosis in a preferred state. Since fn×(tan θn)/Hn is made to be smaller than the upper limit of Conditional expression (1), the focal length in the nearest point-focusing state is not increased excessively. Accordingly, it is advantageous in increasing a depth of field in the nearest point-focusing state. In order to obtain better characteristics, it is more preferable that the objective lens for an endoscope satisfies Conditional expression (1-1) and it is still more preferable that the objective lens for an endoscope satisfies Conditional expression (1-2).

$$1.4 < fn \times (\tan \theta n)/Hn < 2 \tag{1}$$

$$1.5 < fn \times (\tan \theta n)/Hn < 1.9 \tag{1-1}$$

$$1.6 < fn \times (\tan \theta n)/Hn < 1.9 \tag{1-2}$$

In a case where an F number in the nearest point-focusing state is denoted by Fn and an F number in the farthest point-focusing state is denoted by Ff, it is preferable that the objective lens for an endoscope satisfies Conditional expression (2). Since Fn/Ff is made to be larger than the lower limit of Conditional expression (2), it is advantageous in increasing a depth of field in the nearest point-focusing state. Since Fn/Ff is made to be smaller than the upper limit of Conditional expression (2), it is possible to suppress the deterioration of the contrast of an image in the nearest point-focusing state. In order to obtain better characteristics, it is more preferable that the objective lens for an endoscope satisfies Conditional expression (2-1) and it is still more preferable that the objective lens for an endoscope satisfies Conditional expression (2-2).

$$1.1 < Fn/Ff < 3 \tag{2}$$

$$1.2 < Fn/Ff < 2.5 \tag{2-1}$$

$$1.2 < Fn/Ff < 2 \tag{2-2}$$

Since a state where an object to be observed and the objective lens for an endoscope are very close to each other is made in the near point-side observation state of an endoscope, a depth of field is very small in the objective lens for an endoscope in the related art. For this reason, a user is overloaded in the case of a diagnosis, an examination, and/or the like. Accordingly, since it is advantageous in increasing a depth of field in the nearest point-focusing state in a case where the objective lens for an endoscope is adapted to satisfy at least one of Conditional expression (1) or (2), it is easy to reduce a load on the user and to shorten time for a diagnosis, an examination, and/or the like.

In a case where the focal length of the entire system in the nearest point-focusing state is denoted by fn and the focal length of the entire system in the farthest point-focusing state is denoted by ff, it is preferable that the objective lens for an endoscope satisfies Conditional expression (3). Since fn/ff is made to be larger than the lower limit of Conditional expression (3), an angle of view in the nearest point-focusing state is not widened excessively. Accordingly, it is easier to make an observation and a diagnosis in a preferred state. Since fn/ff is made to be smaller than the upper limit of Conditional expression (3), it is advantageous in increasing a depth of field in the nearest point-focusing state. In order to obtain better characteristics, it is more preferable that the objective lens for an endoscope satisfies Conditional expression (3-1).

$$0.7 < fn/ff < 1.2 \tag{3}$$

$$0.8 < fn/ff < 1.1 \tag{3-1}$$

The objective lens for an endoscope includes a stop member including an aperture portion, and may be adapted so that an F number is changed by the movement of the stop member during focusing. In this case, the size of an aperture in a very small region can be changed and a depth of field in the nearest point-focusing state can be widened. The aperture portion of the stop member may be a hole or may be a window consisting of a transmission member through which light can be transmitted.

FIG. 12 shows a first configuration example of the stop member. The upper figure of FIG. 12 shows the configuration of the stop member in the farthest point-focusing state, and the lower figure of FIG. 12 shows the configuration of the stop member in the nearest point-focusing state.

The stop member 10 shown in FIG. 12 is made of metal or a resin, consists of a flat plate member, and has the shape of a fan. A first aperture portion 12 and a second aperture portion 14 are formed in the stop member 10. Light can be transmitted through both the first and the second aperture portions 12 and 14, and both the first and the second aperture portions 12 and 14 have a circular shape. The second aperture portion 14 is a circle smaller than the first aperture portion 12. A portion of the stop member 10 other than the first and second aperture portions 12 and 14 is a light shielding portion through which light is not transmitted, and the light shielding portion is hatched in FIG. 12. The stop member 10 is disposed so that the flat surface of the flat plate member is parallel to a plane perpendicular to the optical axis Z. The stop member 10 can be rotated about a center 16 of an arc of the shape of a fan in a plane perpendicular to the optical axis Z by a moving mechanism (not shown). A surface 20 of FIG. 12 is a surface perpendicular to the optical axis Z at the position of the aperture stop of the objective lens for an endoscope, and the center of the surface 20 is positioned on the optical axis.

In the configuration shown in the upper figure of FIG. 12, the center of the surface 20 and the center of the first aperture portion 12 are disposed so as to coincide with each other. In a case where the stop member 10 is rotated about the center 16 in a direction indicated by an arrow A of FIG. 12, the configuration shown in the upper figure of FIG. 12 can be switched to the configuration shown in the lower figure of FIG. 12. The center of the surface 20 and the center of the second aperture portion 14 coincide with each other in the lower figure of FIG. 12. The diameter of the aperture portion through which light can be transmitted at the position of the aperture stop in the lower figure of FIG. 12 is smaller than that in the upper figure of FIG. 12. Since the stop member 10 is rotated in this way to change the size of the aperture portion through which light can be transmitted, an F number can be changed.

Figure 13:
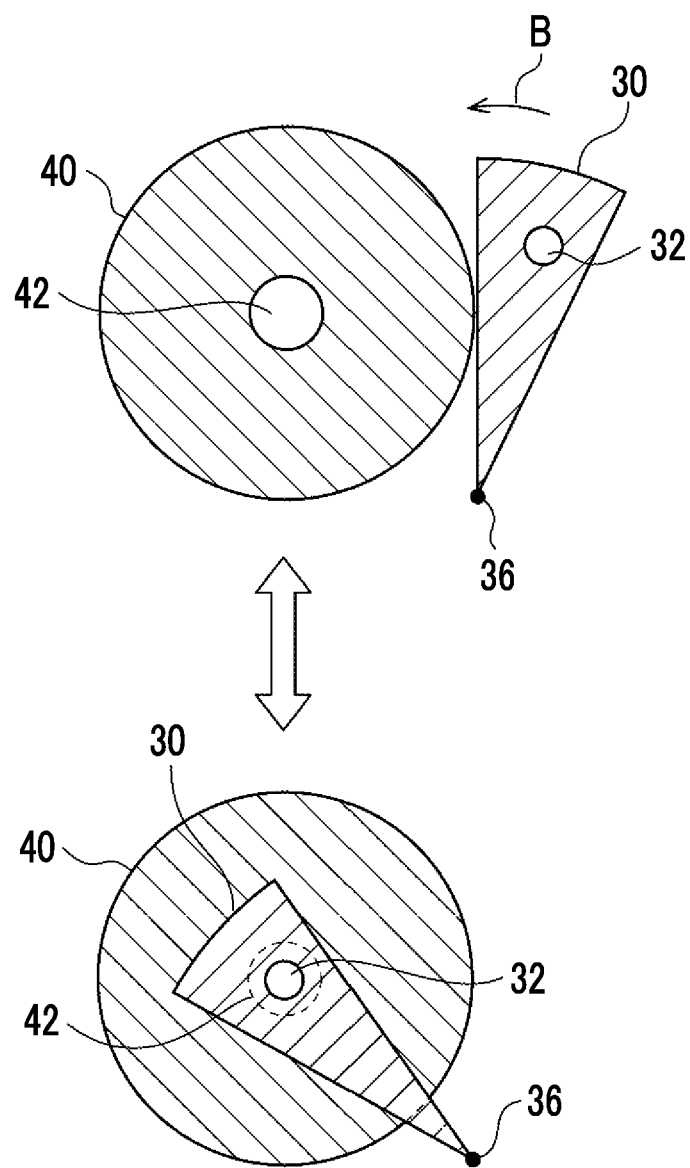
FIG. 13 is a diagram showing a second configuration example of the stop member.

FIG. 13 shows a second configuration example of the stop member. The upper figure of FIG. 13 shows the configuration of the stop member in the farthest point-focusing state, and the lower figure of FIG. 13 shows the configuration of the stop member in the nearest point-focusing state.

Two stop members, that is, a stop member 30 and a stop member 40 are used in the second configuration example. The stop member 30 is made of metal or a resin, consists of a flat plate member, and has the shape of a fan. A circular aperture portion 32 through which light can be transmitted is formed in the stop member 30. A portion of the stop member 30 other than the aperture portion 32 is a light shielding portion through which light is not transmitted, and the light shielding portion is hatched in FIG. 13. The stop member 30 is disposed so that the flat surface of the flat plate member is parallel to a plane perpendicular to the optical axis Z. The stop member 30 can be rotated about a center 36 of an arc of the shape of a fan in a plane perpendicular to the optical axis Z by a moving mechanism (not shown).

The stop member 40 is made of metal or a resin, consists of a flat plate member, and has a circular shape. A circular aperture portion 42 through which light can be transmitted is formed at the central portion of the stop member 40. The aperture portion 42 is a circle larger than the aperture portion 32. A portion of the stop member 40 other than the aperture portion 42 is a light shielding portion through which light is not transmitted, and the light shielding portion is hatched in FIG. 13. The stop member 40 is disposed so that the flat surface of the flat plate member is parallel to a plane perpendicular to the optical axis Z. The stop member 40 is fixed at the position of the aperture stop of the objective lens for an endoscope so that the center of the aperture portion 42 is positioned on the optical axis.

In the configuration shown in the upper figure of FIG. 13, the stop members 30 and 40 do not overlap with each other in a plane perpendicular to the optical axis Z. In a case where the stop member 30 is rotated about the center 36 in a direction indicated by an arrow B of FIG. 13, the configuration shown in the upper figure of FIG. 13 can be switched to the configuration shown in the lower figure of FIG. 13. In the lower figure of FIG. 13, the center of the aperture portion 32 and the center of the aperture portion 42 coincide with each other and a portion of the aperture portion 42 not overlapping with the aperture portion 32 is covered with the light shielding portion of the stop member 30. The diameter of the aperture portion through which light can be transmitted at the position of the aperture stop in the lower figure of FIG. 13 is smaller than that in the upper figure of FIG. 13. Since the stop member 30 is rotated in this way to change the size of the aperture portion through which light can be transmitted, an F number can be changed.

Figure 14:
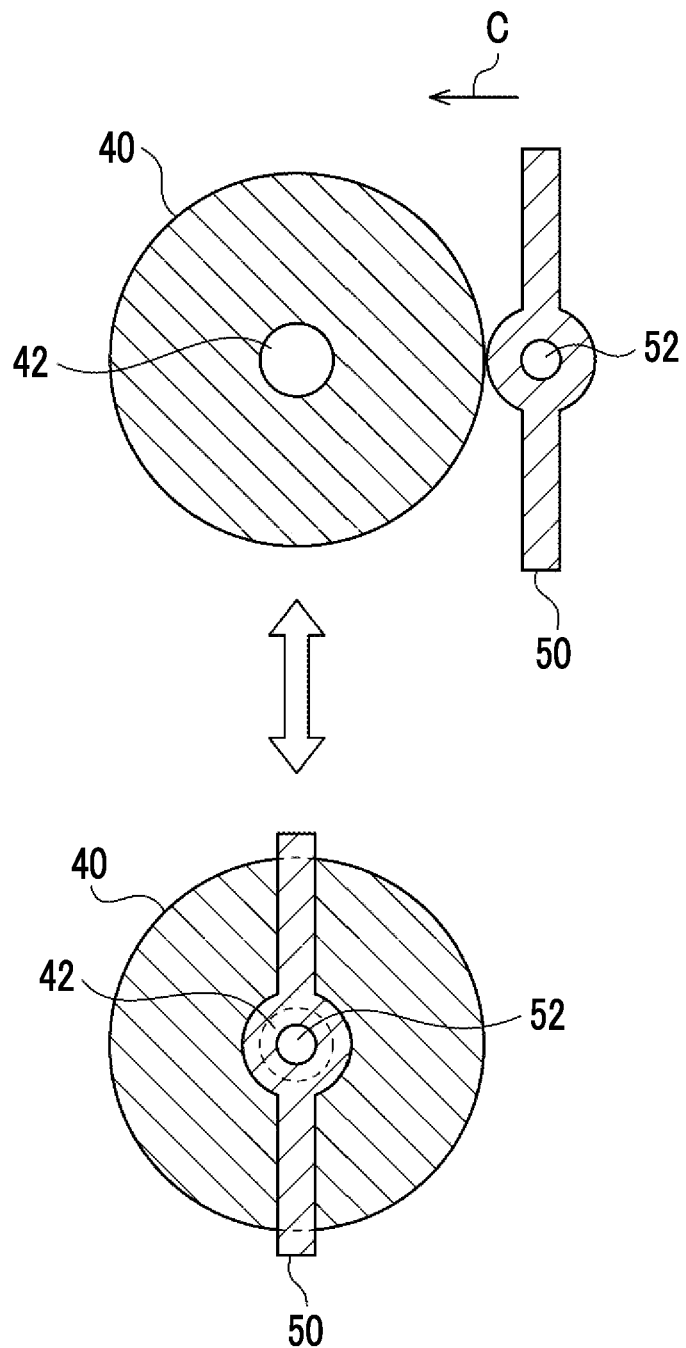
FIG. 14 is a diagram showing a third configuration example of the stop member.

FIG. 14 shows a third configuration example of the stop member. The upper figure of FIG. 14 shows the configuration of the stop member in the farthest point-focusing state, and the lower figure of FIG. 14 shows the configuration of the stop member in the nearest point-focusing state.

The third configuration example is an example in which the stop member 30 of the second configuration example is replaced with a stop member 50. The stop member 50 is made of metal or a resin, consists of a flat plate member, and has an outer shape in which a circle is formed at the center of an elongated rectangle. The circle of the stop member 50 is a circle larger than the aperture portion 42 of the stop member 40. A circular aperture portion 52 through which light can be transmitted is formed at the circular central portion of the stop member 50. The aperture portion 52 is a circle smaller than the aperture portion 42. A portion of the stop member 50 other than the aperture portion 52 is a light shielding portion through which light is not transmitted, and the light shielding portion is hatched in FIG. 14. The stop member 50 is disposed so that the flat surface of the flat plate member is parallel to a plane perpendicular to the optical axis Z. The stop member 50 can be translated in a plane perpendicular to the optical axis Z by a moving mechanism (not shown).

In the configuration shown in the upper figure of FIG. 14, the stop members 30 and 40 do not overlap with each other in a plane perpendicular to the optical axis Z. In a case where the stop member 50 is moved in a direction indicated by an arrow C of FIG. 14, the configuration shown in the upper figure of FIG. 14 can be switched to the configuration shown in the lower figure of FIG. 14. In the lower figure of FIG. 14, the center of the aperture portion 52 and the center of the aperture portion 42 coincide with each other and a portion of the aperture portion 42 not overlapping with the aperture portion 52 is covered with the light shielding portion of the stop member 50. The diameter of the aperture portion through which light can be transmitted at the position of the aperture stop in the lower figure of FIG. 14 is smaller than that in the upper figure of FIG. 14. Since the stop member 50 is moved in this way to change the size of the aperture portion through which light can be transmitted, an F number can be changed.

In the configuration where the objective lens for an endoscope includes the stop member including an aperture portion and an F number is changed by the movement of the stop member, it is preferable that the objective lens for an endoscope satisfies Conditional expression (4). In Conditional expression (4), an interval on the optical axis between the lens disposed on the object side of the aperture stop St in succession to the aperture stop St and the lens disposed on the image side of the aperture stop St in succession to the aperture stop St in the farthest point-focusing state is denoted by Df and the focal length of the entire system in the farthest point-focusing state is denoted by ff. Since ff/Df is made to be larger than the lower limit of Conditional expression (4), it is advantageous in shortening the total optical length of the entire lens system. Since ff/Df is made to be smaller than the upper limit of Conditional expression (4), it is easy to move the stop member to change an F number. In order to obtain better characteristics, it is more preferable that the objective lens for an endoscope satisfies Conditional expression (4-1).

$$0.3 < ff/Df < 15 \quad (4)$$

$$0.5 < ff/Df < 12 \quad (4\text{-}1)$$

In a case where the focal length of the entire system in the nearest point-focusing state is denoted by fn and an interval on the optical axis between the lens disposed on the object side of the aperture stop St in succession to the aperture stop St and the aperture stop St in the nearest point-focusing state is denoted by Dsn, it is preferable that the objective lens for an endoscope satisfies Conditional expression (5). Since fn/Dsn is made to be larger than the lower limit of Conditional expression (5), it is advantageous in shortening the total optical length of the entire lens system. Since fn/Dsn is made to be smaller than the upper limit of Conditional expression (5), it is advantageous in increasing a depth of field in the nearest point-focusing state or it is easier to change an F number. In order to obtain better characteristics, it is more preferable that the objective lens for an endoscope satisfies Conditional expression (5-1).

$$0.3 < fn/Dsn < 2.5 \quad (5)$$

$$0.5 < fn/Dsn < 2 \quad (5\text{-}1)$$

It is preferable that an object-side lens surface of the lens disposed on the object side of the aperture stop St in succession to the aperture stop St is a convex surface. In this case, it is advantageous in suppressing the occurrence of astigmatism.

The objective lens for an endoscope includes an aspherical lens disposed closer to the object side than the aperture stop St, and the aspherical lens may be adapted so as to have an aspherical shape where the object-side lens surface of the aspherical lens has the shape of a convex surface near the optical axis and has positive refractive power increasing toward the periphery. "An aspherical shape where the object-side lens surface of the aspherical lens has the shape of a convex surface and has positive refractive power increasing toward the periphery" mentioned here is an aspherical shape where the object-side lens surface of the aspherical lens has the shape of a convex surface and has the absolute value of a local radius of curvature reduced toward the periphery. In this case, it is advantageous in increasing a depth of field while keeping the diameter of the lens, which is disposed closer to the object side than the aperture stop St, small.

The number of lenses, which are disposed closer to the object side than the aperture stop St and are included in the objective lens for an endoscope, can be, for example, 2 or more and 4 or less. In this case, it is advantageous in achieving both a reduction in size and the ensuring of good performance. The number of lenses, which are disposed closer to the image side than the aperture stop St and are included in the objective lens for an endoscope, can be, for example, 3 or more and 5 or less. In this case, it is advantageous in achieving both a reduction in size and the ensuring of good performance.

Since the above-mentioned preferable configuration and possible configuration including even configuration related to Conditional expressions can be randomly combined, it is preferable that the above-mentioned preferable configuration and possible configuration are appropriately selectively employed according to specifications to be required. The range of a possible conditional expression is not limited to Conditional expression written in the form of an expression, and includes ranges that are obtained from random combinations of the lower and the upper limits of the preferable conditional expressions, the more preferable conditional expressions, and the still more preferable conditional expressions.

Two preferred aspects of the objective lens for an endoscope according to the embodiment of the disclosure will be described below. A first aspect is an objective lens for an endoscope comprising an aperture stop St, at least one lens which is disposed closer to the object side than the aperture stop St and of which an image-side lens surface is a concave surface, and at least one set of cemented lenses that is disposed closer to the image side than the aperture stop St. Focusing on an object positioned at the nearest point from an object positioned at the farthest point is performed by the movement of some lenses of the entire system along an optical axis Z; and the objective lens for an endoscope has a total angle of view of 120° or more in a state where focusing on the object positioned at the farthest point is performed and in a state where focusing on the object positioned at the nearest point is performed, and satisfies Conditional expression (1).

A second aspect is an objective lens for an endoscope comprising an aperture stop St, at least one lens which is disposed closer to an object side than the aperture stop St and of which an image-side lens surface is a concave surface, and at least one set of cemented lenses that is disposed closer to an image side than the aperture stop St. Focusing on an object positioned at the nearest point from an object positioned at the farthest point is performed by the movement of some lenses of the entire system along an optical axis Z; and the objective lens for an endoscope has a total angle of view of 120° or more in a state where focusing on the object positioned at the farthest point is performed and in a state where focusing on the object positioned at the nearest point is performed, and satisfies Conditional expression (2).

Next, examples of the objective lens for an endoscope according to the embodiment of the disclosure will be described. Reference numerals given to the lenses in cross-sectional views of the respective examples are used independently for every example in order to avoid the complication of description caused by an increase in the number of digits of the reference numerals. Accordingly, even though common reference numerals are given to components in the drawings of different examples, the components are not necessarily common.

Example 1

Since a cross-sectional view showing the configuration of an objective lens for an endoscope of Example 1 is shown in FIG. 1 and an illustrating method therefor is as described above, the repeated description thereof will be partially omitted here. The objective lens for an endoscope of Example 1 consists of a negative lens L1, a positive lens L2, an aperture stop St, a positive lens L3, a positive lens L4, and a negative lens L5 that are arranged in this order from the object side toward the image side. The lenses L4 and L5 are cemented to each other, and each of all the other lenses is a single lens. A focus lens group consists of the lenses L4 and L5. The focus lens group is moved to the object side during focusing on the object positioned at the nearest point from the object positioned at the farthest point.

The basic lens data of the objective lens for an endoscope of Example 1 are shown in Table 1, the specifications and variable surface intervals thereof are shown in Table 2, and the aspherical coefficients thereof are shown in Table 3. In Table 1, surface numbers, which are obtained in a case where an object surface is set as a zero surface and the surface number is increased toward the image side one by one, are written in the column of Sn, the radii of curvature of the respective surfaces are written in the column of R, and a surface interval on an optical axis between each surface and a surface, which is positioned on the image side of each surface so as to be adjacent to each surface, is written in the column of D. The refractive indexes of the respective components with respect to the d line are written in the column of Nd, and the Abbe's numbers of the respective components with respect to the d line are written in the column of νd.

In Table 1, the sign of the radius of curvature of a surface having a convex shape toward the object side is positive and the sign of the radius of curvature of a surface having a convex shape toward the image side is negative. In Table 1, the optical member PP is also shown together. In Table 1, the expressions of (Obj), (St), and (Sim) are written together with the surface numbers in the spaces of the surface numbers of surfaces corresponding to the object surface, the aperture stop St, and the image plane Sim, respectively. In Table 1, the symbol of DD[ ] is used for an interval that varies in the farthest point-focusing state and the nearest point-focusing state, and a surface number corresponding to the object side of this interval is added into [ ] and is written in the column of D. DD[0] of Table 1 is a distance on the optical axis between an object and the objective lens for an endoscope, and is a so-called object distance.

The respective values of the focal length ff, the F number Ff, the total angle 2θf of view, and the maximum image height Hf of the entire system in the farthest point-focusing state are shown in Table shown in the upper row of Table 2. The respective values of the focal length fn, the F number Fn, the total angle 2θn of view, and the maximum image height Hn of the entire system in the nearest point-focusing state are shown in Table shown in the lower row of Table 2. (°) in the space of the total angle of view means that a unit is a degree. Values shown in Table 2 are values that are obtained in a case where the d line is used as a reference.

In the basic lens data, * is added to the surface number of an aspheric surface and the numerical value of a paraxial radius of curvature is written in the column of the radius of curvature of an aspheric surface. In Table 3, the surface numbers of aspheric surfaces are written in the column of Sn, the numerical values of the aspherical coefficients of the respective aspheric surfaces are written in the rows of KA and Am (m=4, 6, 8, and 10). "E±n" (n: integer) of the numerical value of the aspherical coefficient shown in Table 3 means "×10$^{±n}$". KA and Am are the aspherical coefficients of an aspherical equation expressed as the following equation.

$$Zd = C \times h^2 / \{1 + (1 - KA \times C^2 \times h^2)^{1/2}\} + \Sigma Am \times h^m$$

Here, Zd: depth of aspheric surface (the length of a perpendicular from a point on the aspheric surface having a height h to a plane which is perpendicular to the optical axis and to which the vertex of an aspheric surface is tangent)
- h: height (a distance between the optical axis and the lens surface)
- C: inverse number of paraxial radius of curvature
- KA, Am: aspherical coefficient
- Σ of aspherical equation means sum with respect to m.

Values in each table to be described below and data in diagrams showing aberrations to be described later are values in a case where the entire system is standardized so that the focal length of the entire system in the farthest point-focusing state is 1.000. Further, numerical values, which are rounded off to a predetermined place, are written in each table to be described below.

TABLE 1

Example 1

| Sn | R | D | Nd | vd |
|---|---|---|---|---|
| 0(Obj) | ∞ | DD[0] | | |
| *1 | 7.142 | 0.357 | 1.85135 | 40.1 |
| *2 | 0.845 | 0.630 | | |
| 3 | −22.588 | 2.542 | 1.89286 | 20.4 |
| 4 | −4.064 | 0.000 | | |
| 5(St) | ∞ | 0.138 | | |
| 6 | −3.946 | 0.954 | 1.618 | 63.3 |
| 7 | −1.558 | DD[7] | | |
| 8 | −26.081 | 0.990 | 1.59522 | 67.7 |
| 9 | −1.135 | 0.408 | 1.89286 | 20.4 |
| 10 | −1.957 | DD[10] | | |
| 11 | ∞ | 3.265 | 1.55920 | 53.9 |
| 12 | ∞ | 0.306 | 1.51633 | 64.1 |
| 13 | ∞ | 0.050 | | |
| 14(Sim) | | | | |

TABLE 2

Example 1

Farthest point-focusing state

| ff | 1.000 |
|---|---|
| Ff | 8.20 |
| 2θf(°) | 132.6 |
| Hf | 1.398 |
| DD[0] | 13.262 |
| DD[7] | 0.620 |
| DD[10] | 0.409 |

Nearest point-focusing state

| fn | 0.977 |
|---|---|
| Fn | 12.00 |

TABLE 2-continued

Example 1

| 2θn(°) | 133.4 |
|---|---|
| Hn | 1.398 |
| DD[0] | 3.316 |
| DD[7] | 0.401 |
| DD[10] | 0.628 |

TABLE 3

Example 1

| Sn | 1 | 2 |
|---|---|---|
| KA | 1.0000000E+00 | 1.0000000E+00 |
| A4 | 1.0155127E−01 | −1.7185666E−01 |
| A6 | −3.7152932E−02 | 7.8355761E−01 |
| A8 | 2.6922216E−03 | −3.6399038E−01 |
| A10 | 8.8580013E−04 | −5.1535956E−01 |

A diagram showing the respective aberrations of the objective lens for an endoscope of Example 1 is shown in FIG. 3. A diagram showing a spherical aberration, a diagram showing astigmatism, a diagram showing distortion, and a diagram showing a lateral chromatic aberration are shown in FIG. 3 in this order from the left. In FIG. 3, the diagrams showing the respective aberrations obtained in the farthest point-focusing state are shown in the upper row and the diagrams showing the respective aberrations obtained in the nearest point-focusing state are shown in the lower row. The diagrams showing the respective aberrations obtained in the farthest point-focusing state and the nearest point-focusing state are diagrams in cases where object distances are set to values of DD[0] in Tables described above. In the diagram showing the spherical aberration, aberrations with respect to the e line, the F line, and the C line are shown by a solid line, a dashed line, and a two-dot chain line, respectively. In the diagram showing astigmatism, an aberration with respect to the e line in a sagittal direction is shown by a solid line and an aberration with respect to the e line in a tangential direction is shown by a short-dashed line. In the diagram showing distortion, an aberration with respect to the e line is shown by a solid line. In the diagram showing a lateral chromatic aberration, aberrations with respect to the F line and the C line are shown by a dashed line and a two-dot chain line, respectively. Corresponding values of an F number and a half angle of view are written at the upper ends of vertical axes of the respective diagrams in FIG. 3.

Since the symbols, meanings, writing methods, and illustrating methods for data about Example 1 are the same as those of other examples to be described below unless otherwise specified, the repeated description thereof will be partially omitted below.

Example 2

A cross-sectional view showing the configuration of an objective lens for an endoscope of Example 2 is shown in FIG. 4. The objective lens for an endoscope of Example 2 consists of a negative lens L1, a negative lens L2, a positive lens L3, an aperture stop St, a positive lens L4, a positive lens L5, and a negative lens L6 that are arranged in this order from the object side toward the image side. The lenses L2 and L3 are cemented to each other, the lenses L5 and L6 are cemented to each other, and each of all the other lenses is a single lens. A focus lens group consists of the lenses L5 and L6. The focus lens group is moved to the object side during focusing on the object positioned at the nearest point from the object positioned at the farthest point.

Figure 5:
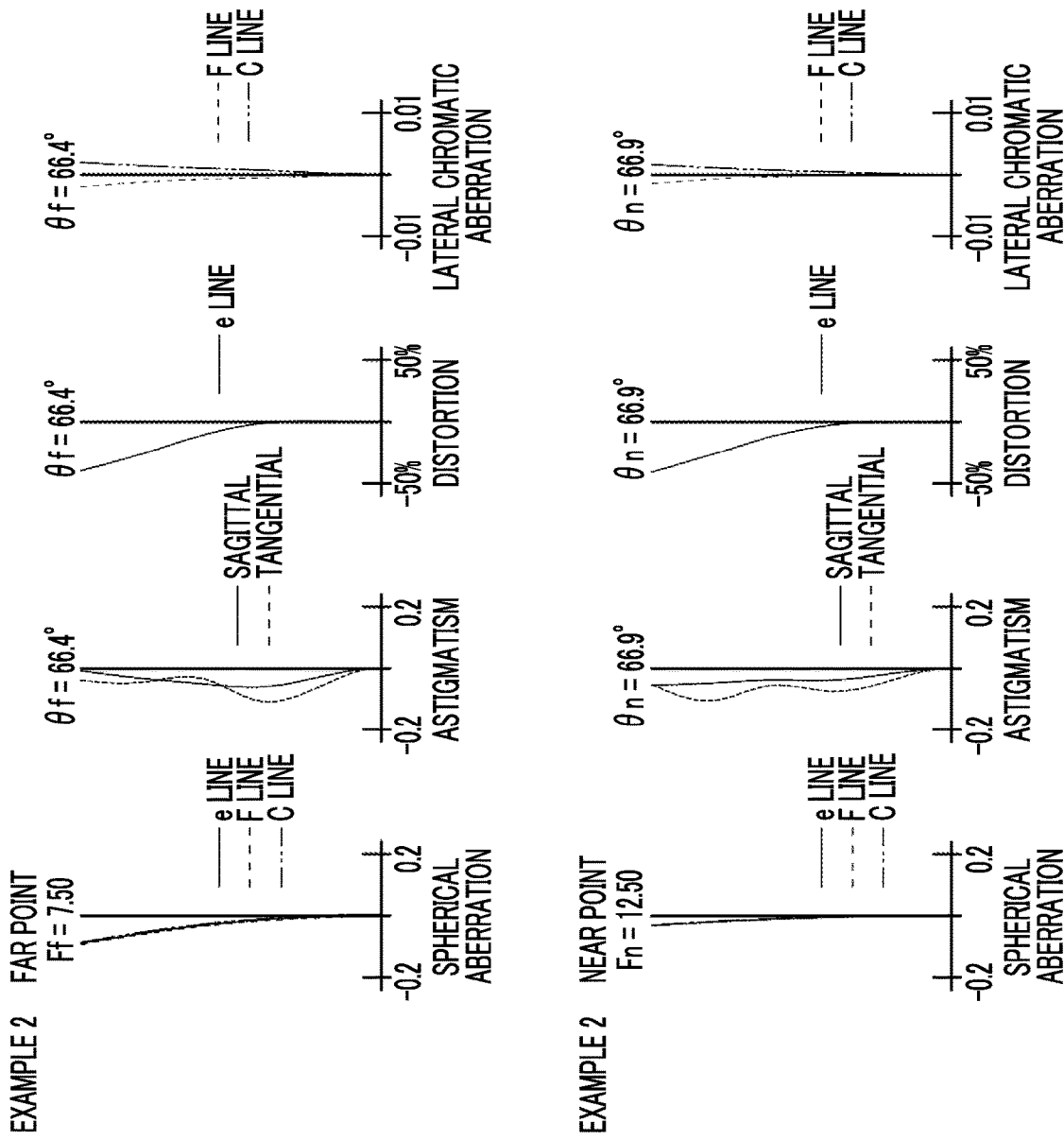
FIG. 5 is a diagram showing the respective aberrations of the objective lens for an endoscope of Example 2.

The basic lens data of the objective lens for an endoscope of Example 2 are shown in Table 4, the specifications and variable surface intervals thereof are shown in Table 5, the aspherical coefficients thereof are shown in Table 6, and diagrams showing the respective aberrations are shown in FIG. 5.

TABLE 4

Example 2

| Sn | R | D | Nd | vd |
|---|---|---|---|---|
| 0(Obj) | ∞ | DD[0] | | |
| *1 | 2.691 | 0.355 | 1.88202 | 37.2 |
| *2 | 0.673 | 0.565 | | |
| 3 | −5.814 | 0.532 | 1.88300 | 40.8 |
| 4 | 0.962 | 1.137 | 1.74 | 28.3 |
| 5 | −2.8713 | 0.146 | | |
| 6(St) | ∞ | 0.086 | | |
| 7 | −5.299 | 0.763 | 1.49700 | 81.5 |
| 8 | −1.067 | DD[8] | | |
| 9 | −18.047 | 0.924 | 1.61800 | 63.3 |
| 10 | −1.084 | 0.406 | 1.85896 | 22.7 |
| 11 | −2.0798 | DD[11] | | |
| 12 | ∞ | 3.248 | 1.5592 | 53.9 |
| 13 | ∞ | 0.304 | 1.51633 | 64.1 |
| 14 | ∞ | 0.051 | | |
| 15(Sim) | ∞ | | | |

TABLE 5

Example 2

Farthest point-focusing state

| ff | 1.000 |
|---|---|
| Ff | 7.50 |
| 2θf(°) | 132.9 |
| Hf | 1.393 |
| DD[0] | 15.223 |
| DD[8] | 0.689 |
| DD[11] | 0.392 |

Nearest point-focusing state

| fn | 0.967 |
|---|---|
| Fn | 12.50 |
| 2θn(°) | 133.8 |
| Hn | 1.393 |
| DD[0] | 2.537 |
| DD[8] | 0.355 |
| DD[11] | 0.726 |

TABLE 6

Example 2

| Sn | 1 | 2 |
|---|---|---|
| KA | 1.0000000E+00 | 1.0000000E+00 |
| A4 | 1.4745937E−01 | −1.9571303E−01 |
| A6 | −2.0620125E−01 | 9.7477283E−01 |
| A8 | 1.2199511E−01 | −3.0360557E+00 |
| A10 | −2.2199092E−02 | 5.9481829E−01 |

Example 3

Figure 6:
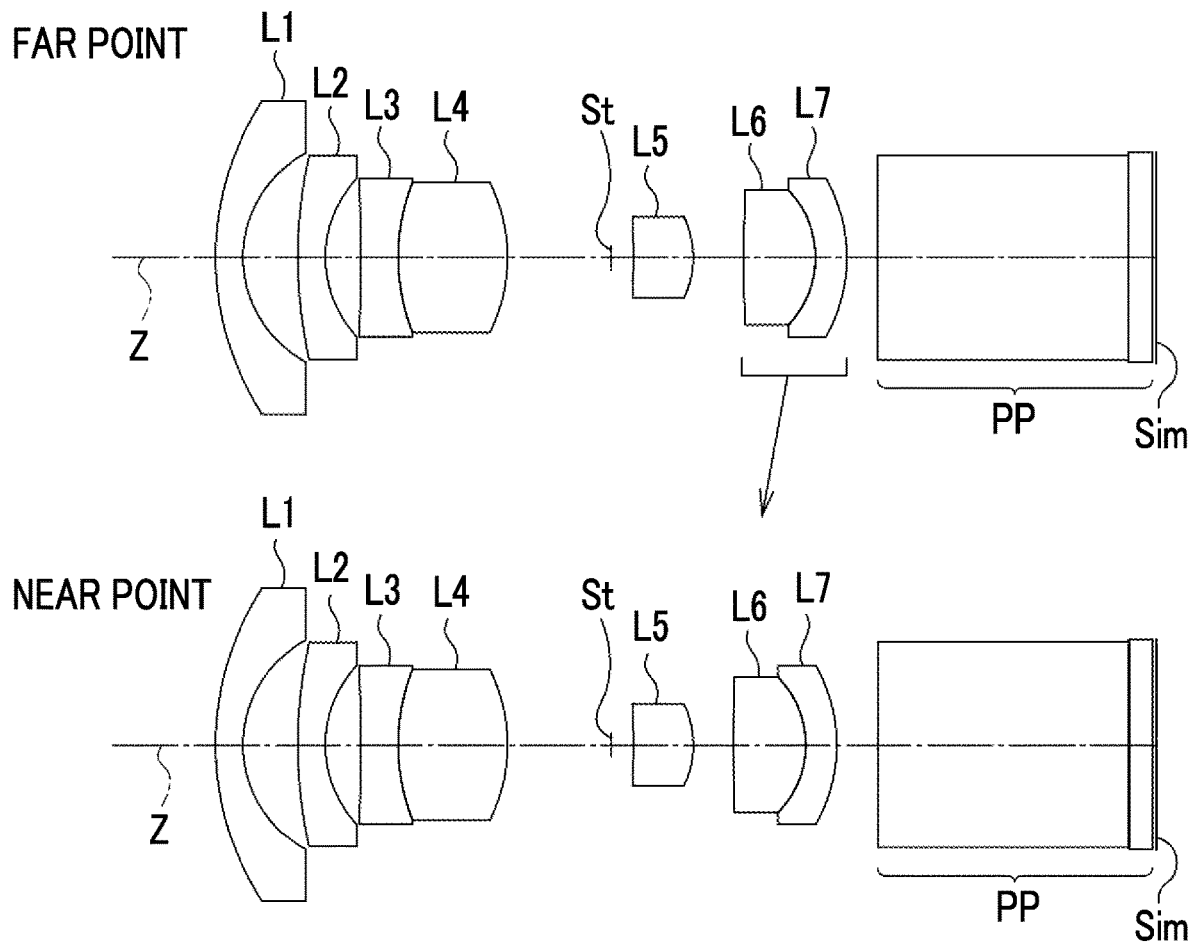
FIG. 6 is a cross-sectional view showing the configuration of an objective lens for an endoscope of Example 3.

A cross-sectional view showing the configuration of an objective lens for an endoscope of Example 3 is shown in FIG. 6. The objective lens for an endoscope of Example 3 consists of a negative lens L1, a negative lens L2, a negative lens L3, a positive lens L4, an aperture stop St, a positive lens L5, a positive lens L6, and a negative lens L7 that are arranged in this order from the object side toward the image side. The lenses L3 and L4 are cemented to each other, the lenses L6 and L7 are cemented to each other, and each of all the other lenses is a single lens. A focus lens group consists of the lenses L6 and L7. The focus lens group is moved to the object side during focusing on the object positioned at the nearest point from the object positioned at the farthest point.

Figure 7:
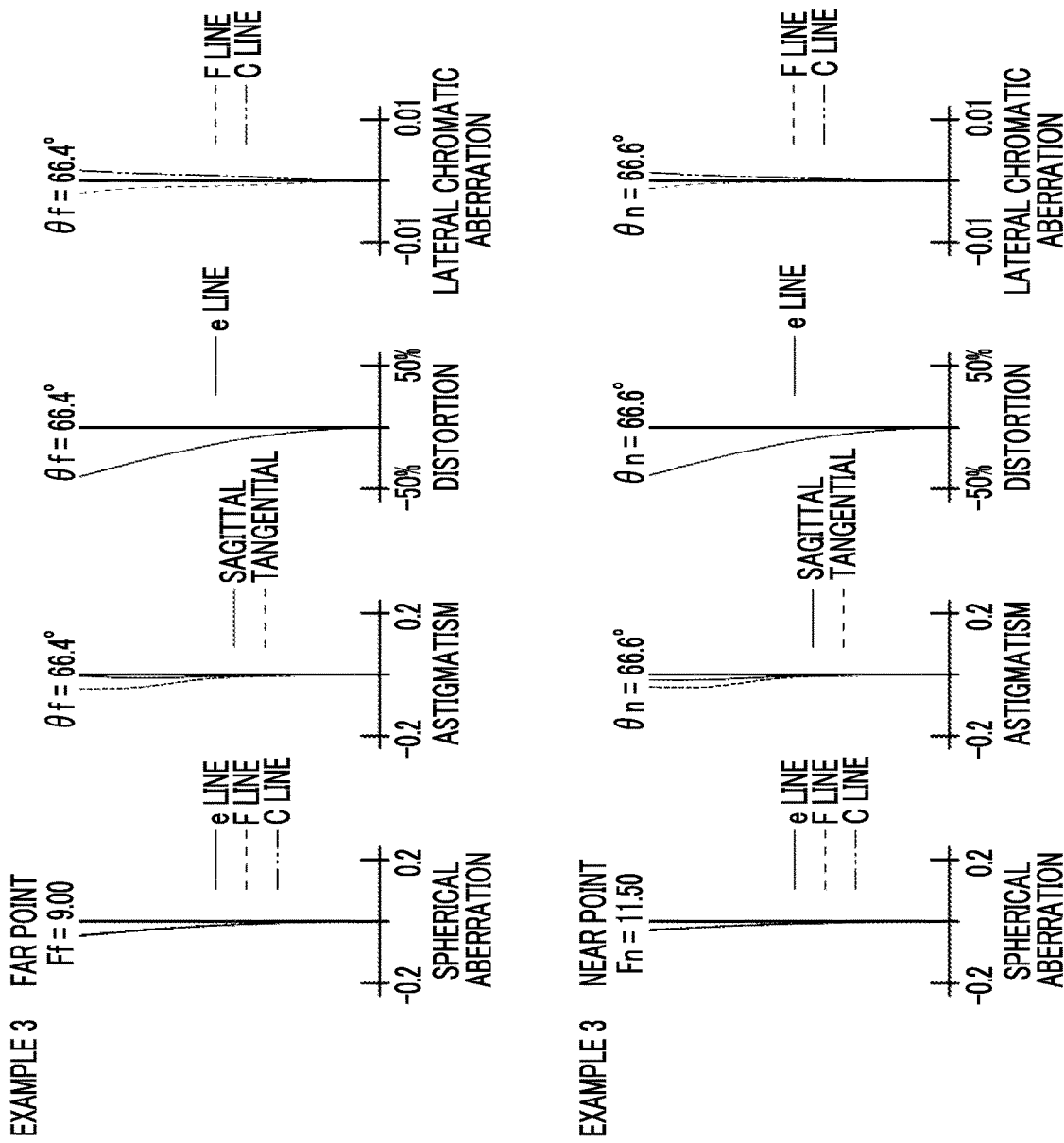
FIG. 7 is a diagram showing the respective aberrations of the objective lens for an endoscope of Example 3.

The basic lens data of the objective lens for an endoscope of Example 3 are shown in Table 7, the specifications and variable surface intervals thereof are shown in Table 8, and diagrams showing the respective aberrations are shown in FIG. 7.

TABLE 7

Example 3

| Sn | R | D | Nd | vd |
|---|---|---|---|---|
| 0(Obj) | ∞ | DD[0] | | |
| 1 | 3.727 | 0.347 | 1.88300 | 40.8 |
| 2 | 1.531 | 0.702 | | |
| 3 | 6.020 | 0.347 | 1.90366 | 31.3 |
| 4 | 1.511 | 0.451 | | |
| 5 | −27.8141 | 0.472 | 1.83481 | 42.7 |
| 6 | 2.6494 | 1.382 | 1.69895 | 30.1 |
| 7 | −2.227 | 1.317 | | |
| 8(St) | ∞ | 0.27 | | |
| 9 | −2.433 | 0.750 | 1.49700 | 81.5 |
| 10 | −1.236 | DD[10] | | |
| 11 | 24.4857 | 0.91 | 1.53775 | 74.7 |
| 12 | −1.265 | 0.396 | 1.89286 | 20.4 |
| 13 | −2.1036 | DD[13] | | |
| 14 | ∞ | 3.171 | 1.55920 | 53.9 |
| 15 | ∞ | 0.297 | 1.51633 | 64.1 |
| 16 | ∞ | 0.050 | | |
| 17(Sim) | ∞ | | | |

TABLE 8

Example 3

Farthest point-focusing state

| ff | 1.000 |
|---|---|
| Ff | 9.00 |
| 2θf(°) | 132.8 |
| Hf | 1.360 |
| DD[0] | 9.909 |
| DD[10] | 0.635 |
| DD[13] | 0.397 |

Nearest point-focusing state

| fn | 0.987 |
|---|---|
| Fn | 11.50 |
| 2θn(°) | 133.1 |
| Hn | 1.360 |
| DD[0] | 3.963 |
| DD[10] | 0.507 |
| DD[13] | 0.525 |

Example 4

Figure 8:
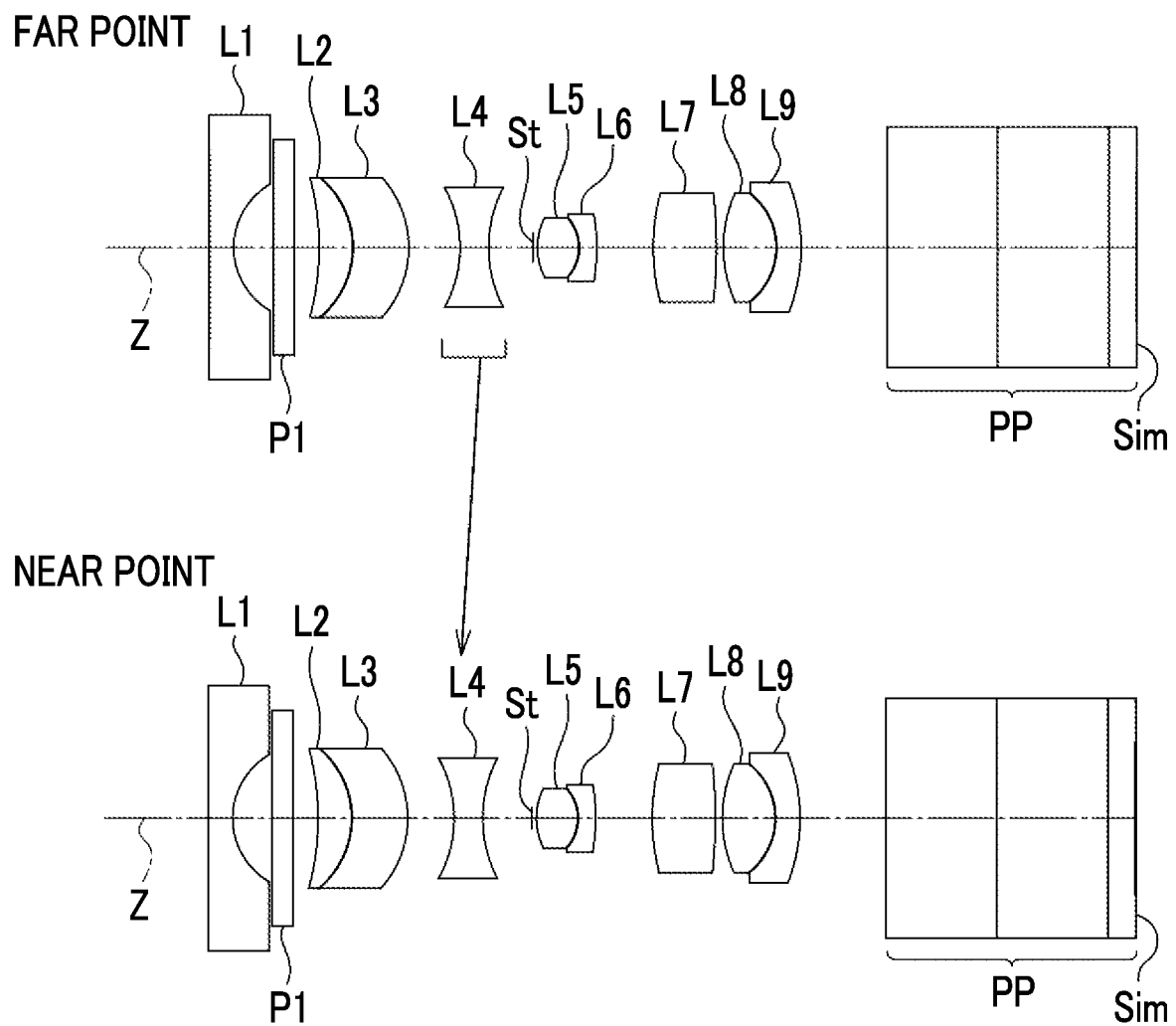
FIG. 8 is a cross-sectional view showing the configuration of an objective lens for an endoscope of Example 4.

A cross-sectional view showing the configuration of an objective lens for an endoscope of Example 4 is shown in FIG. 8. The objective lens for an endoscope of Example 4 consists of a negative lens L1, an optical member P1, a positive lens L2, a positive lens L3, a negative lens L4, an aperture stop St, a positive lens L5, a negative lens L6, a positive lens L7, a positive lens L8, and a negative lens L9 that are arranged in this order from the object side toward the image side. The optical member P1 is a parallel flat plate-like member assuming a filter, a cover glass, or the like, and is a member not having refractive power. The objective lens for an endoscope can also be adapted so that the optical member P1 is omitted. The lenses L2 and L3 are cemented to each other, the lenses L5 and L6 are cemented to each other, the lenses L8 and L9 are cemented to each other, and each of all the other lenses is a single lens. A focus lens group consists of the lens L4. The focus lens group is moved to the object side during focusing on the object positioned at the nearest point from the object positioned at the farthest point.

Figure 9:
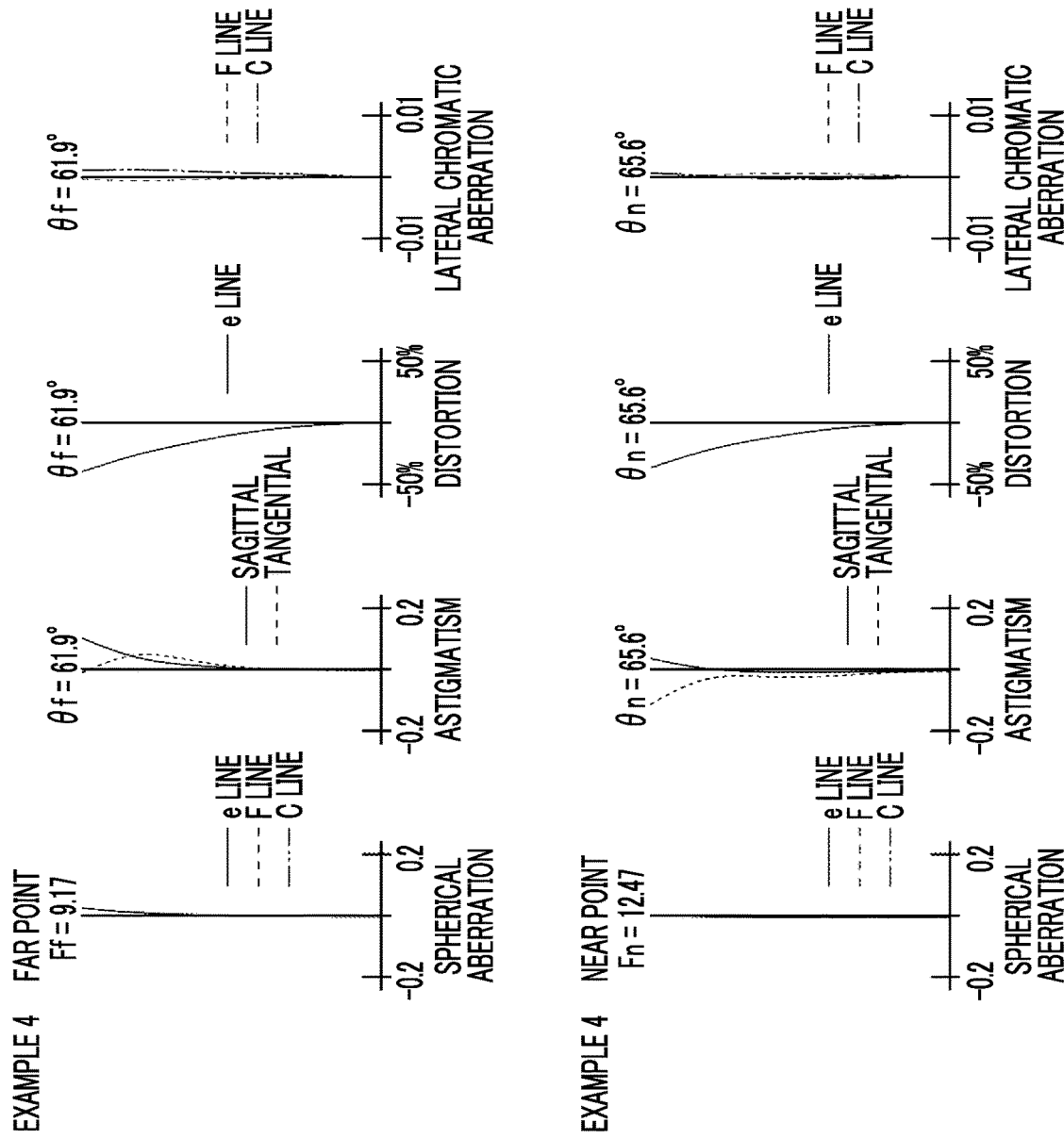
FIG. 9 is a diagram showing the respective aberrations of the objective lens for an endoscope of Example 4.

The basic lens data of the objective lens for an endoscope of Example 4 are shown in Table 9, the specifications and variable surface intervals thereof are shown in Table 10, and diagrams showing the respective aberrations are shown in FIG. 9.

TABLE 9

Example 4

| Sn | R | D | Nd | vd |
|---|---|---|---|---|
| 0(Obj) | ∞ | DD[0] | | |
| 1 | ∞ | 0.354 | 1.88299 | 40.78 |
| 2 | 1.101 | 0.579 | | |
| 3 | ∞ | 0.304 | 2.00100 | 29.13 |
| 4 | ∞ | 0.364 | | |
| 5 | −4.092 | 0.486 | 1.79887 | 47.85 |
| 6 | −1.372 | 0.822 | 1.43875 | 94.66 |
| 7 | −1.580 | DD[7] | | |
| 8 | −1.857 | 0.415 | 1.75500 | 52.32 |
| 9 | 1.967 | DD[9] | | |
| 10(St) | ∞ | 0.068 | | |
| 11 | 1.006 | 0.618 | 1.57968 | 40.06 |
| 12 | −0.674 | 0.253 | 1.90094 | 37.91 |
| 13 | −3.002 | 0.810 | | |
| 14 | 3.268 | 0.921 | 1.43875 | 94.66 |
| 15 | −7.612 | 0.101 | | |
| 16 | 2.003 | 0.780 | 1.43875 | 94.66 |
| 17 | −1.037 | 0.354 | 1.95227 | 32.77 |
| 18 | −2.703 | 1.255 | | |
| 19 | ∞ | 1.619 | 1.88299 | 40.78 |
| 20 | ∞ | 1.619 | 1.88299 | 40.78 |
| 21 | ∞ | 0.405 | 1.47144 | 65.41 |
| 22(Sim) | ∞ | | | |

TABLE 10

Example 4

Farthest point-focusing state

| ff | 1.000 |
| Ff | 9.17 |
| 2θf(°) | 123.8 |
| Hf | 1.105 |
| DD[0] | 13.661 |
| DD[7] | 0.748 |
| DD[9] | 0.643 |

Nearest point-focusing state

| Fn | 0.935 |
| Fn | 12.47 |
| 2θn(°) | 131.2 |
| Hn | 1.105 |
| DD[0] | 1.801 |
| DD[7] | 0.678 |
| DD[9] | 0.714 |

Example 5

A cross-sectional view showing the configuration of an objective lens for an endoscope of Example 5 is shown in FIG. 10. The objective lens for an endoscope of Example 5 consists of a negative lens L1, an optical member P1, a positive lens L2, a negative lens L3, a positive lens L4, an aperture stop St, a positive lens L5, a negative lens L6, a positive lens L7, a positive lens L8, and a negative lens L9 that are arranged in this order from the object side toward the image side. The optical member P1 of Example 5 is the same member as the optical member P1 of Example 4. The lenses L2 and L3 are cemented to each other, the lenses L5 and L6 are cemented to each other, the lenses L8 and L9 are cemented to each other, and each of all the other lenses is a single lens. The focus lens group consists of the lenses L5 and L6. The focus lens group is moved to the image side during focusing on the object positioned at the nearest point from the object positioned at the farthest point.

Figure 11:
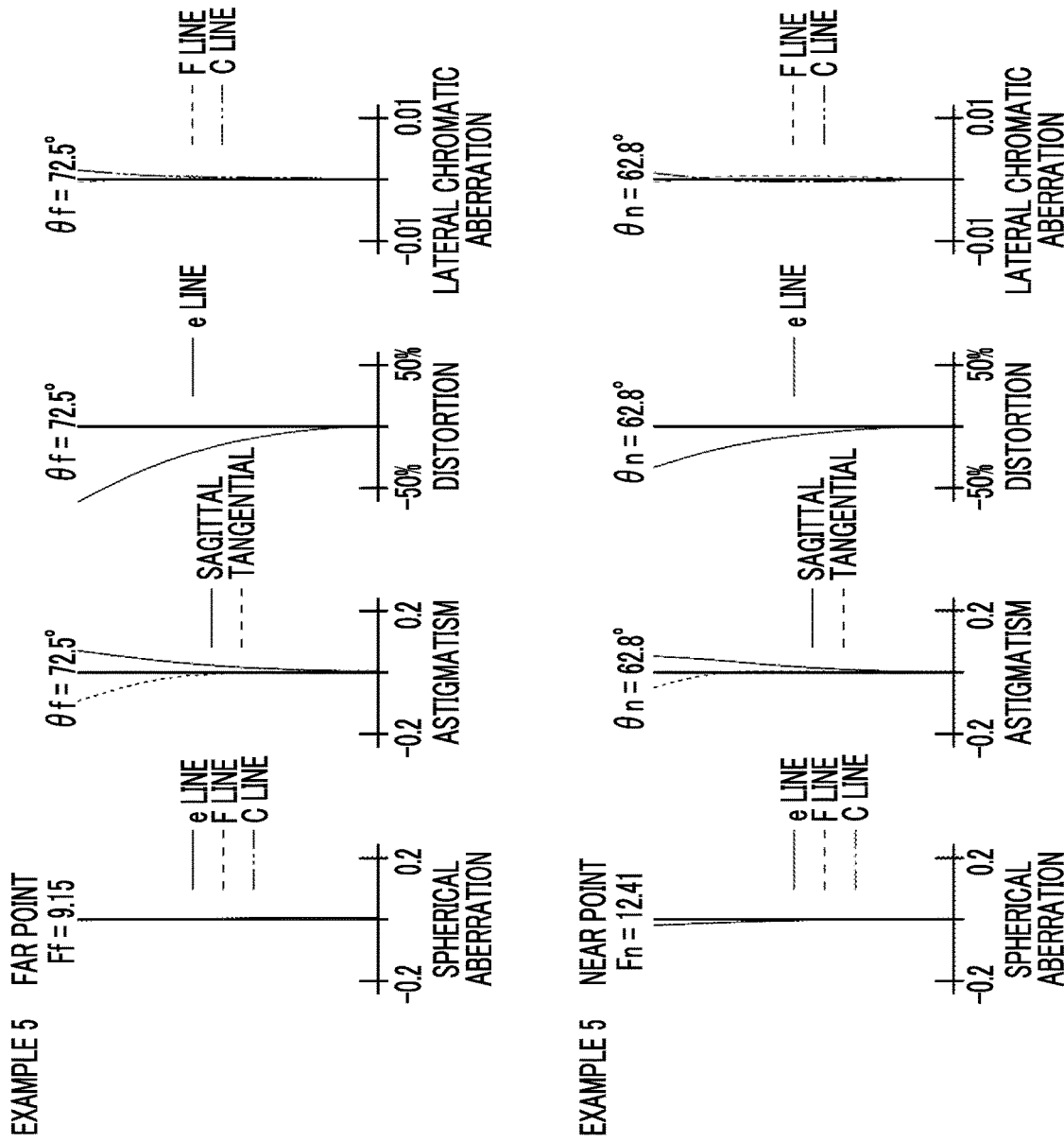
FIG. 11 is a diagram showing the respective aberrations of the objective lens for an endoscope of Example 5.

The basic lens data of the objective lens for an endoscope of Example 5 are shown in Table 11, the specifications and variable surface intervals thereof are shown in Table 12, and diagrams showing the respective aberrations are shown in FIG. 11.

TABLE 11

Example 5

| Sn | R | D | Nd | vd |
|---|---|---|---|---|
| 0(Obj) | ∞ | DD[0] | | |
| 1 | ∞ | 0.379 | 1.88299 | 40.78 |
| 2 | 1.314 | 0.644 | | |
| 3 | ∞ | 0.325 | 2.00100 | 29.13 |
| 4 | ∞ | 0.206 | | |
| 5 | −25.340 | 0.650 | 1.80264 | 47.74 |
| 6 | −1.509 | 0.336 | 1.43875 | 94.66 |
| 7 | 1.041 | 1.461 | | |
| 8 | 2.486 | 0.698 | 1.49700 | 81.54 |
| 9 | −1.764 | 0.539 | | |
| 10(St) | ∞ | DD[10] | | |
| 11 | −1.753 | 0.357 | 1.89286 | 20.36 |
| 12 | −0.613 | 0.271 | 2.00069 | 25.46 |
| 13 | −2.119 | DD[13] | | |
| 14 | −3.502 | 0.433 | 1.49700 | 81.54 |
| 15 | −1.502 | 0.108 | | |
| 16 | −17.919 | 0.606 | 1.43875 | 94.66 |
| 17 | −1.164 | 0.325 | 1.94595 | 17.98 |
| 18 | −1.895 | 1.126 | | |
| 19 | ∞ | 1.732 | 1.88299 | 40.78 |
| 20 | ∞ | 1.732 | 1.88299 | 40.78 |
| 21 | ∞ | 0.433 | 1.47144 | 65.41 |
| 22(Sim) | ∞ | | | |

TABLE 12

Example 5

Farthest point-focusing state

| ff | 1.000 |
| Ff | 9.15 |
| 2θf(°) | 145.0 |
| Hf | 1.182 |
| DD[0] | 14.613 |
| DD[10] | 0.343 |
| DD[13] | 0.831 |

Nearest point-focusing state

| fn | 1.071 |
| Fn | 12.41 |
| 2θn(°) | 125.6 |

TABLE 12-continued

| Example 5 | |
|---|---|
| Hn | 1.182 |
| DD[0] | 1.927 |
| DD[10] | 1.003 |
| DD[13] | 0.170 |

The values of Conditional expressions (1) to (5) corresponding to the objective lenses for an endoscope of Examples 1 to 5 are shown in Table 13. Table 13 shows values with respect to the d line.

TABLE 13

| Expression number | Expression | Example 1 | Example 2 | Example 3 | Example 4 | Example 5 |
|---|---|---|---|---|---|---|
| (1) | fn × (tanθn)/Hn | 1.62 | 1.63 | 1.68 | 1.86 | 1.76 |
| (2) | Fn/Ff | 1.46 | 1.67 | 1.28 | 1.36 | 1.36 |
| (3) | fn/ff | 0.98 | 0.97 | 0.99 | 0.93 | 1.07 |
| (4) | ff/Df | 7.26 | 4.30 | 0.63 | 1.41 | 1.13 |
| (5) | fn/Dsn | — | 6.62 | 0.75 | 1.31 | 1.99 |

Figure 15:
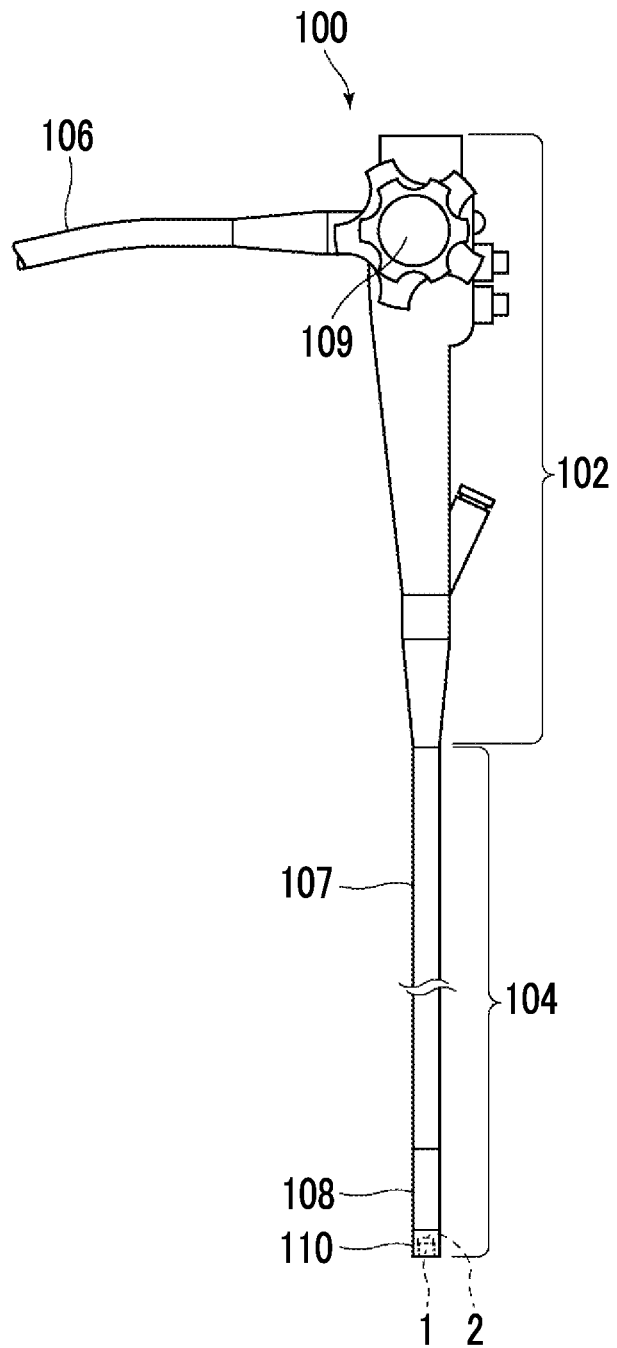
FIG. 15 is a diagram showing the schematic configuration of an endoscope according to an embodiment.

Next, an endoscope according to an embodiment of the disclosure will be described. A diagram showing the schematic configuration of the entire endoscope according to the embodiment of the disclosure is shown in FIG. 15. The endoscope 100 shown in FIG. 15 mainly comprises an operation part 102, an insertion part 104, and a universal cord 106 that is to be connected to a connector part (not shown). A large portion of the insertion part 104 is a soft portion 107 that is bendable in any direction along an insertion path, a bendable portion 108 is connected to the distal end of the soft portion 107, and a distal end portion 110 is connected to the distal end of the bendable portion 108. The bendable portion 108 is provided to allow the distal end portion 110 to face a desired direction, and can be operated to be bent by the rotational movement of bending operation knobs 109 provided on the operation part 102. The objective lens 1 for an endoscope according to the embodiment of the disclosure and an image pickup element 2 are provided in the distal end of the distal end portion 110. The image pickup element 2 is, for example, a charge coupled device (CCD), a complementary metal oxide semiconductor (CMOS), or the like. The image pickup element 2 is disposed so that the image pickup surface of the image pickup element 2 coincides with the image plane of the objective lens 1 for an endoscope. The objective lens 1 for an endoscope and the image pickup element 2 are conceptually shown in FIG. 15.

A technique of the disclosure has been described above using the embodiments and the examples, but the technique of the disclosure may have various modifications without being limited to the embodiments and the examples. For example, the radius of curvature, the surface interval, the refractive index, the Abbe's number, the aspherical coefficient, and the like of each lens may have other values without being limited to values shown in the respective numerical examples.

What is claimed is:
1. An objective lens for an endoscope comprising:
a stop;
at least one lens which is disposed closer to an object side than the stop and of which an image-side lens surface is a concave surface; and
at least one set of cemented lenses that is disposed closer to an image side than the stop,
wherein focusing on an object positioned at a nearest point from an object positioned at a farthest point is performed by integral movement of a lens group, which includes a lens of the objective lens for an endoscope closest to the image side, along the optical axis,
the objective lens for an endoscope has a total angle of view of 120° or more in a state where focusing on the object positioned at the farthest point is performed and in a state where focusing on the object positioned at the nearest point is performed,
in a case where a focal length of the objective lens for an endoscope in a state where focusing on the object positioned at the nearest point is performed is denoted by fn, a half angle of view in a state where focusing on the object positioned at the nearest point is performed is denoted by θn, and a maximum image height in a state where focusing on the object positioned at the nearest point is performed is denoted by Hn, Conditional expression (1) is satisfied,

$$1.4 < fn \times (\tan \theta n)/Hn < 2 \qquad (1),$$

in a case where an interval on the optical axis between a lens, which is disposed on an object side of the stop in succession to the stop, and the stop in a state where focusing on the object positioned at the nearest point is performed is denoted by Dsn, Conditional expression (5) is satisfied, $$0.3 < fn/Dsn < 2.5 \qquad (5).$$

2. An objective lens for an endoscope comprising:
a stop;
at least one lens which is disposed closer to an object side than the stop and of which an image-side lens surface is a concave surface; and
at least one set of cemented lenses that is disposed closer to an image side than the stop,
wherein focusing on an object positioned at a nearest point from an object positioned at a farthest point is performed by movement of a part of the objective lens for an endoscope along an optical axis,
the objective lens for an endoscope has a total angle of view of 120° or more in a state where focusing on the object positioned at the farthest point is performed and in a state where focusing on the object positioned at the nearest point is performed, and
in a case where an F number in a state where focusing on the object positioned at the nearest point is performed is denoted by Fn and an F number in a state where focusing on the object positioned at the farthest point is performed is denoted by Ff, Conditional expression (2) is satisfied, $$1.1 < Fn/Ff < 3 \qquad (2).$$

3. The objective lens for an endoscope according to claim 1,
wherein Conditional expression (1-1) is satisfied, $$1.5 < fn \times (\tan \theta n)/Hn < 1.9 \quad (1\text{-}1).$$

4. The objective lens for an endoscope according to claim 1,
wherein, in a case where an F number in a state where focusing on the object positioned at the nearest point is performed is denoted by Fn and an F number in a state where focusing on the object positioned at the farthest point is performed is denoted by Ff, Conditional expression (2-1) is satisfied, $$1.2 < Fn/Ff < 2.5 \quad (2\text{-}1).$$

5. The objective lens for an endoscope according to claim 1,
wherein, in a case where a focal length of the objective lens for an endoscope in a state where focusing on the object positioned at the nearest point is performed is denoted by fn and a focal length of the objective lens for an endoscope in a state where focusing on the object positioned at the farthest point is performed is denoted by ff, Conditional expression (3) is satisfied, $$0.7 < fn/ff < 1.2 \quad (3).$$

6. The objective lens for an endoscope according to claim 1, further comprising:
a stop member that includes an aperture portion,
wherein an F number is changed by movement of the stop member during the focusing.

7. The objective lens for an endoscope according to claim 6,
wherein, in a case where an interval on the optical axis between a lens disposed on an object side of the stop in succession to the stop and a lens disposed on an image side of the stop in succession to the stop in a state where focusing on the object positioned at the farthest point is performed is denoted by Df and a focal length of the objective lens for an endoscope in a state where focusing on the object positioned at the farthest point is performed is denoted by ff, Conditional expression (4) is satisfied, $$0.3 < ff/Df < 15 \quad (4).$$

8. The objective lens for an endoscope according to claim 1, further comprising:
an aspherical lens which is disposed closer to the object side than the stop and of which an object-side lens surface has a shape of a convex surface near the optical axis and has positive refractive power increasing toward a periphery.

9. The objective lens for an endoscope according to claim 1,
wherein an object-side lens surface of a lens, which is disposed on an object side of the stop in succession to the stop, is a convex surface.

10. The objective lens for an endoscope according to claim 1,
wherein focusing on the object positioned at the nearest point from the object positioned at the farthest point is performed by integral movement of the lens group, which includes at least one lens disposed in succession to the stop, along the optical axis.

11. The objective lens for an endoscope according to claim 3,
wherein Conditional expression (1-2) is satisfied, $$1.6 < fn \times (\tan \theta n)/Hn < 1.9 \quad (1\text{-}2).$$

12. The objective lens for an endoscope according to claim 4,
wherein Conditional expression (2-2) is satisfied, $$1.2 < Fn/Ff < 2 \quad (2\text{-}2).$$

13. The objective lens for an endoscope according to claim 5,
wherein Conditional expression (3-1) is satisfied, $$0.8 < fn/ff < 1.1 \quad (3\text{-}1).$$

14. The objective lens for an endoscope according to claim 7,
wherein Conditional expression (4-1) is satisfied, $$0.5 < ff/Df < 12 \quad (4\text{-}1).$$

15. The objective lens for an endoscope according to claim 1,
wherein Conditional expression (5-1) is satisfied, $$0.5 < fn/Dsn < 2 \quad (5\text{-}1).$$

16. An endoscope comprising:
the objective lens for an endoscope according to claim 1.

* * * * *